(12) United States Patent
Moon et al.

(10) Patent No.: US 8,330,083 B2
(45) Date of Patent: Dec. 11, 2012

(54) PORTABLE COUNTERTOP ELECTRIC OVEN

(75) Inventors: Jung S. Moon, Buffalo Grove, IL (US);
Gene H. Kim, Grayslake, IL (US);
Mikale K. Kwon, Glenview, IL (US);
Eung Y. Choi, Glenview, IL (US);
Byong G. Choi, Vernon Hills, IL (US)

(73) Assignee: Hearthware, Inc., Libertyville, IL (US)

( * ) Notice: Subject to any disclaimer, the term of this patent is extended or adjusted under 35 U.S.C. 154(b) by 0 days.

(21) Appl. No.: 13/046,700

(22) Filed: Mar. 12, 2011

(65) Prior Publication Data
US 2011/0220632 A1    Sep. 15, 2011

Related U.S. Application Data

(63) Continuation-in-part of application No. 11/987,487, filed on Nov. 30, 2007, now Pat. No. 7,964,824.

(60) Provisional application No. 61/313,571, filed on Mar. 12, 2010.

(51) Int. Cl.
*H05B 1/02* (2006.01)

(52) U.S. Cl. ............ 219/490; 219/458.1; 219/494; 219/412

(58) Field of Classification Search ........... 219/490, 219/494, 497, 505, 506, 412–414, 458.1
See application file for complete search history.

(56) References Cited

U.S. PATENT DOCUMENTS

| | | |
|---|---|---|
| 2,274,325 A | 2/1942 | Ford |
| D133,344 S | 8/1942 | Austin |
| 2,654,824 A | 10/1953 | Schroeder |
| 2,848,592 A | 8/1958 | Mergen |
| 2,864,932 A | 12/1958 | Forrer |
| 2,893,307 A | 7/1959 | Rodriguez |
| 3,281,575 A | 10/1966 | Ferguson, Jr. |
| D212,820 S | 11/1968 | Benes |
| 3,851,639 A | 12/1974 | Beddoe |

(Continued)

FOREIGN PATENT DOCUMENTS

KR    1996-0002662    3/1996

(Continued)

OTHER PUBLICATIONS

International Search Report and Written Opinion of the International Search Authority for Application No. PCT/US11/28354.

(Continued)

*Primary Examiner* — Mark Paschall
(74) *Attorney, Agent, or Firm* — Albrecht Tousi & Farnum PLLC; Ralph P. Albrecht

(57) ABSTRACT

A portable countertop electric oven for cooking food includes: a cooking housing; a power head operative to attach, connect, and/or couple, to the cooking housing, at least a portion of the power head extending into an interior of the cooking housing; a base operative to attach, connect, and/or couple, to the cooking housing; and a first securing element operable to secure the cooking housing to the base. A porting element may be provided, such as a handle formed from a portion of the power head, which may include first and second bulged regions of the power head. At least one of: the cooking housing; the power head and the base, may have a substantially elliptical shape, and may include two bulged portions at respective distal ends. The first securing element may be an attachment clip including a first region operable to engage with the cooking housing and a second region operable to engage with the base.

20 Claims, 13 Drawing Sheets

U.S. PATENT DOCUMENTS

| | | |
|---|---|---|
| 3,882,767 A | 5/1975 | Oyler et al. |
| 4,188,520 A | 2/1980 | Dills |
| 4,198,040 A | 4/1980 | Colasent |
| 4,210,072 A | 7/1980 | Pedrini |
| 4,350,874 A | 9/1982 | Nishikawa |
| 4,476,848 A | 10/1984 | Protas |
| 4,625,097 A | 11/1986 | Miwa |
| 4,629,850 A | 12/1986 | Tanabe |
| 4,629,865 A | 12/1986 | Freedman |
| 4,663,517 A | 5/1987 | Huff et al. |
| D293,539 S | 1/1988 | Nishikawa |
| 4,756,091 A | 7/1988 | Van Denend |
| 4,817,509 A | 4/1989 | Erickson |
| D302,095 S | 7/1989 | Nishikawa |
| D302,642 S | 8/1989 | Nishikawa |
| 4,870,255 A | 9/1989 | Fujii |
| 4,913,047 A | 4/1990 | Burley |
| D313,679 S | 1/1991 | Sakamoto |
| 5,045,671 A | 9/1991 | Kanaya et al. |
| 5,097,112 A | 3/1992 | Kanaya et al. |
| 5,107,097 A | 4/1992 | Negandhi et al. |
| D328,834 S | 8/1992 | Chang |
| 5,157,239 A | 10/1992 | Kanaya et al. |
| 5,165,328 A | 11/1992 | Erickson et al. |
| 5,217,545 A | 6/1993 | Smith |
| D344,873 S | 3/1994 | Chang |
| 5,329,919 A | 7/1994 | Chang |
| 5,338,616 A | 8/1994 | Ishii |
| D350,449 S | 9/1994 | Kaneko |
| D355,564 S | 2/1995 | Dornbush et al. |
| 5,403,607 A | 4/1995 | Erickson |
| 5,404,420 A | 4/1995 | Song |
| 5,416,950 A | 5/1995 | Dornbush |
| D358,963 S | 6/1995 | Kaneko |
| 5,423,249 A | 6/1995 | Meyer |
| 5,437,108 A | 8/1995 | Alseth |
| 5,438,916 A | 8/1995 | Dornbush |
| D364,308 S | 11/1995 | Chang |
| 5,465,651 A | 11/1995 | Erickson |
| 5,466,912 A | 11/1995 | Dornbush |
| 5,484,621 A | 1/1996 | Erickson |
| 5,485,780 A | 1/1996 | Koether et al. |
| D367,396 S | 2/1996 | Hsu |
| D369,274 S | 4/1996 | Dornbush et al. |
| D369,514 S | 5/1996 | Baldwin |
| 5,513,558 A | 5/1996 | Erickson |
| 5,520,096 A | 5/1996 | Dornbush |
| 5,534,681 A | 7/1996 | Hwang |
| 5,548,102 A | 8/1996 | Kwon |
| 5,598,769 A | 2/1997 | Luebke et al. |
| 5,676,044 A | 10/1997 | Lara |
| 5,699,722 A | 12/1997 | Erickson |
| 5,735,190 A | 4/1998 | Sham |
| 5,747,781 A | 5/1998 | Kim et al. |
| 5,793,023 A | 8/1998 | Hong et al. |
| 5,801,357 A | 9/1998 | Danen |
| 5,801,362 A | 9/1998 | Pearlman et al. |
| 5,845,563 A | 12/1998 | Haring |
| 5,877,477 A | 3/1999 | Petty |
| 5,878,508 A | 3/1999 | Knoll et al. |
| 5,880,436 A | 3/1999 | Keogh |
| 5,974,957 A | 11/1999 | Ysen |
| 6,018,146 A | 1/2000 | Uzgiris et al. |
| D424,862 S | 5/2000 | Holbrook |
| 6,069,345 A | 5/2000 | Westerberg |
| 6,085,442 A | 7/2000 | Erickson |
| 6,093,918 A | 7/2000 | Sohn |
| 6,093,919 A | 7/2000 | Seo et al. |
| 6,127,666 A | 10/2000 | Sohn |
| 6,172,347 B1 | 1/2001 | Lee |
| 6,198,076 B1 | 3/2001 | Moen |
| 6,201,217 B1 | 3/2001 | Moon et al. |
| 6,255,630 B1 | 7/2001 | Barnes et al. |
| 6,316,757 B1 | 11/2001 | Kim et al. |
| 6,363,836 B1 | 4/2002 | Usherovich |
| 6,448,540 B1 | 9/2002 | Braunisch et al. |
| 6,502,265 B2 | 1/2003 | Blair |
| D469,657 S | 2/2003 | Becker |
| 6,521,870 B2 | 2/2003 | Nolan et al. |
| 6,617,554 B2 | 9/2003 | Moon |
| D487,670 S | 3/2004 | Moon |
| 6,727,478 B2 | 4/2004 | Rael |
| 6,730,880 B2 | 5/2004 | Smith |
| D490,648 S | 6/2004 | Moon |
| 6,747,250 B1 | 6/2004 | Cha |
| 6,809,301 B1 | 10/2004 | McIntyre et al. |
| 6,917,016 B2 | 7/2005 | Baecker et al. |
| 6,917,017 B2 | 7/2005 | Moon et al. |
| 6,936,795 B1 | 8/2005 | Moon |
| 6,940,049 B2 | 9/2005 | Harwell et al. |
| 6,967,314 B2 | 11/2005 | Sauter et al. |
| 7,012,220 B2 | 3/2006 | Boyer et al. |
| 7,021,203 B2 | 4/2006 | Backus |
| 7,159,510 B2 | 1/2007 | Lamaster et al. |
| 7,225,729 B2 | 6/2007 | Backus |
| 7,323,663 B2 | 1/2008 | Cavada et al. |
| 7,348,521 B2 | 3/2008 | Lee et al. |
| 7,360,533 B2 | 4/2008 | Mcfadden |
| 7,479,006 B2 | 1/2009 | Newsom |
| 7,487,716 B2 | 2/2009 | Swank et al. |
| 7,619,186 B2 | 11/2009 | Cavada et al. |
| 2002/0023545 A1 | 2/2002 | Backus |
| 2002/0144607 A1 | 10/2002 | Backus |
| 2003/0062360 A1 | 4/2003 | Moon |
| 2005/0172835 A1 | 8/2005 | Lamaster et al. |
| 2006/0144250 A1 | 7/2006 | Backus |
| 2006/0225580 A1 | 10/2006 | Fernandez |
| 2008/0190911 A1 | 8/2008 | Adamski |
| 2009/0025248 A1 | 1/2009 | Lannon |

FOREIGN PATENT DOCUMENTS

| | | |
|---|---|---|
| WO | WO-2009-070338 | 4/2009 |

OTHER PUBLICATIONS

Hearthware's Memorandum of Law in Support of Its Motion for Reconsideration, Mar. 9, 2011.

DI 172—Morningware's Opposition to Hearthware's Motion for Reconsideration, Mar. 17, 2011.

DI 185—Court grants IBC-Hearthware, Inc.'s motion for partial reconsideration, Hon. A. J. St. Eve—Apr. 12, 2011.

Alternative Pioneering Systems, Inc., Jet—Stream Oven Recipes and instructions, 1990, 65 pgs.

ISR& WO in PCT/US08/13235.

Hearthware's LPR 2.2 Initial Infringement Contentions—Oct. 28, 2009.

Morningware's LPR 2.3 Initial Invalidity, Noninfr. and Unenf. Contentions—Nov. 9, 2009.

Hearthware's initial Response to Invalidity Contentions Pursuant to LPR 2.5—Jan. 22, 2010.

DI 107, 107a, 107b, and 107c—Hearthware's First Amended Counterclaims including exhibits A, B, and C—Feb. 11, 2010.

DI 125 and DI 125a—Morningware's Supplemental Answer to Hearthware's First Amended Counterclaims and Exhibit—Apr. 29, 2010.

Morningware's LPR 3.1 Final Invalidity and Unenf. Contentions—Jul. 6, 2010.

Hearthware's LPR 3.1 Amended and Final Infringement Contentions—Jul. 6, 2010.

Memorandum in Support of Morningware's Motion to Strike Hearthware Home Product's LPR 3.1 Final Infringement Contentions and Dismiss Hearthware's Infringement Claims—Jul. 21, 2010.

Morningware's LPR 3.2 Final Non-Infringement Contentions—Aug. 3, 2010.

Hearthware's Opposition to Morningware's Motion to Strike Hearthware's LPR 3.1 Final Infringement Contentions—Aug. 16, 2010.

Morningware's Reply to Hearthware's Opposition to Morningware's Motion to Strike Hearthware's LPR 3.1 Final Infringement Contentions—Aug. 30, 2010.

Hearthware's Response to Morningware's Invalidity Contentions Pursuant to LPR 3.2—Aug. 3, 2010.

Morningware's Opening Claim Construction Brief and Exhibits A, B, C & D—Under LRP 4.2—Sep. 22, 2010.

Hearthware's Claim Construction Brief Under LPR 4.2 and Appendix E—Oct. 20, 2010.

DI 144—Plaintiff's Counterdefendant Morningware, Inc.'s Reply Claim Construction Brief on U.S. Patent No. 6,201,217 Pursuant to LPR 4.2(D)—Nov. 3, 2010.

DI 134-1—Joint Claim Construction Chart—Sep. 8, 2010.

Final Joint Claim Construction Chart—Nov. 10, 2010.

DI 163—Markman Memorandum Opinion and Order, Hon. J. St. Eve—Feb. 23, 2011.

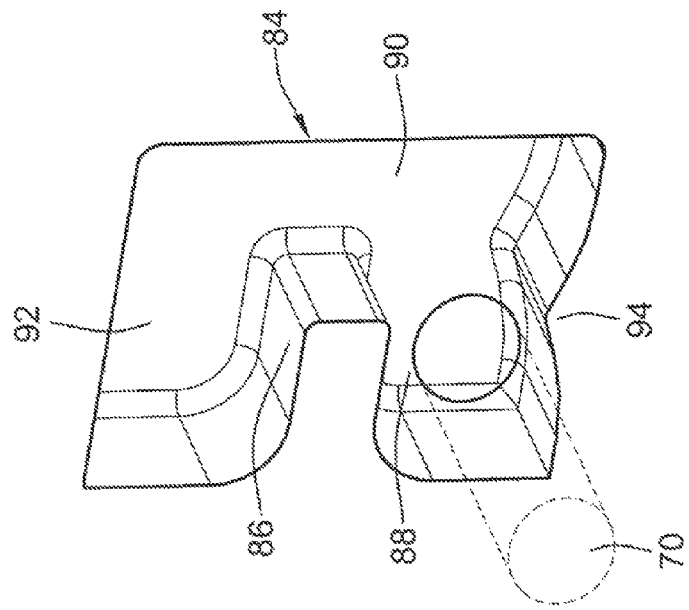
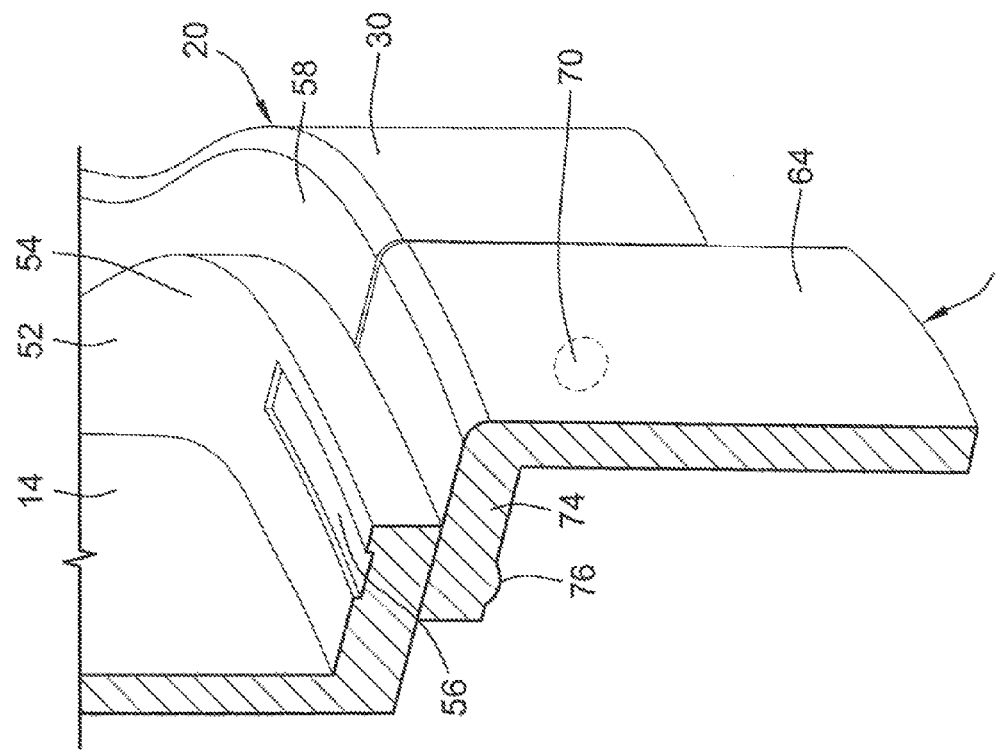

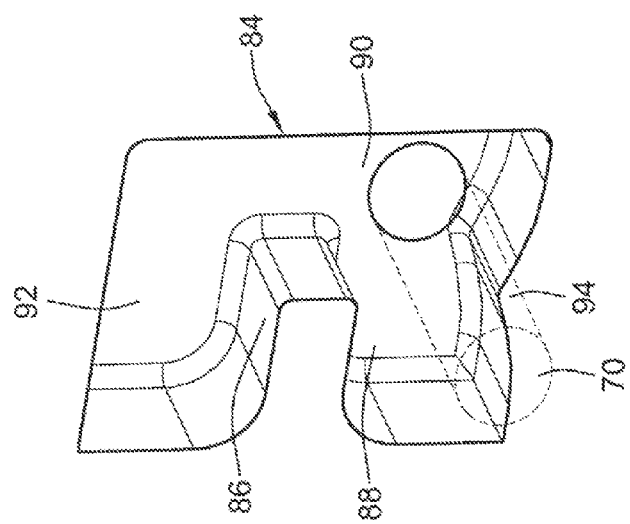
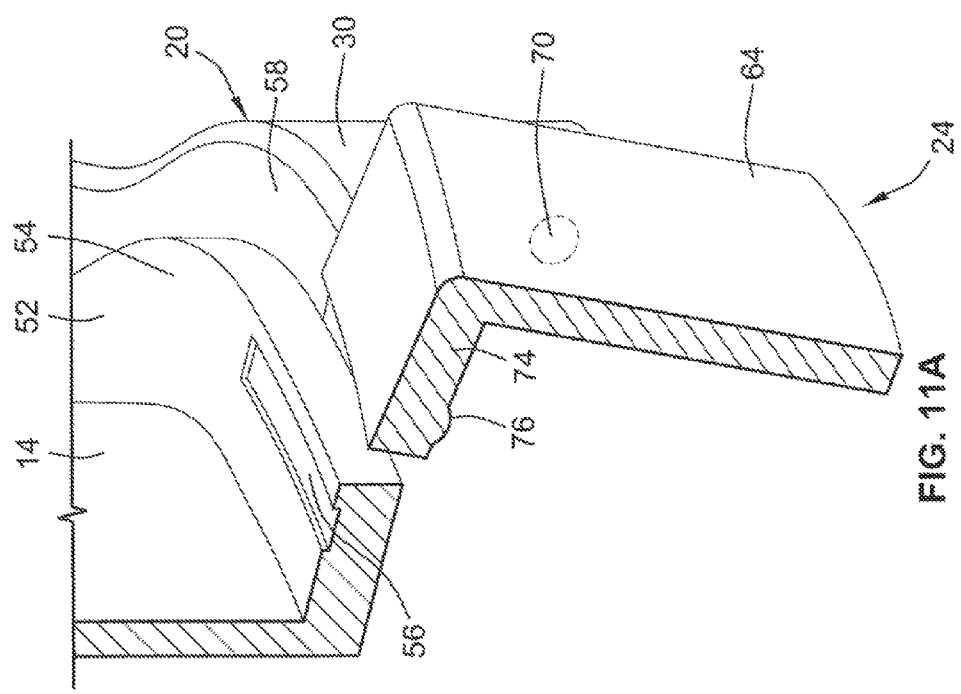

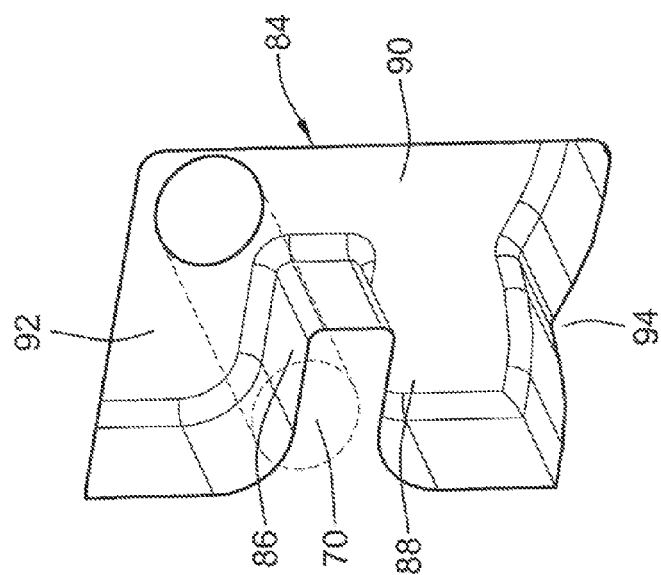
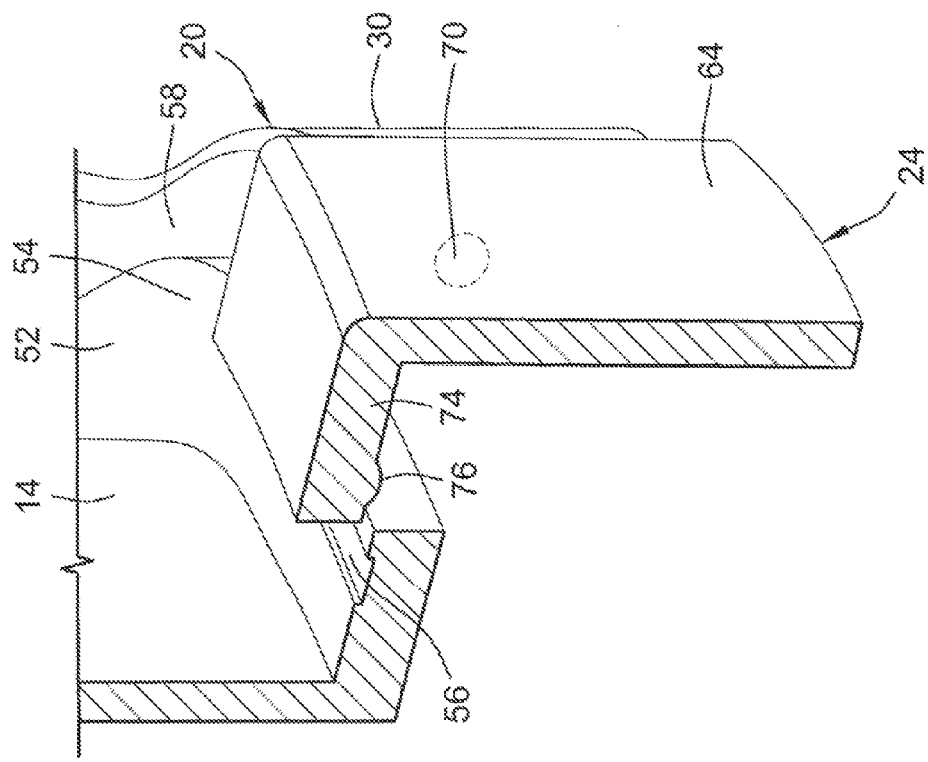

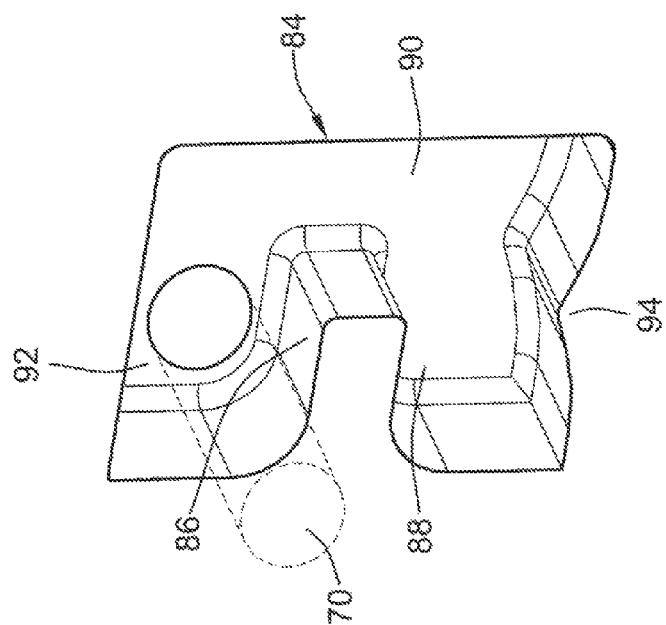
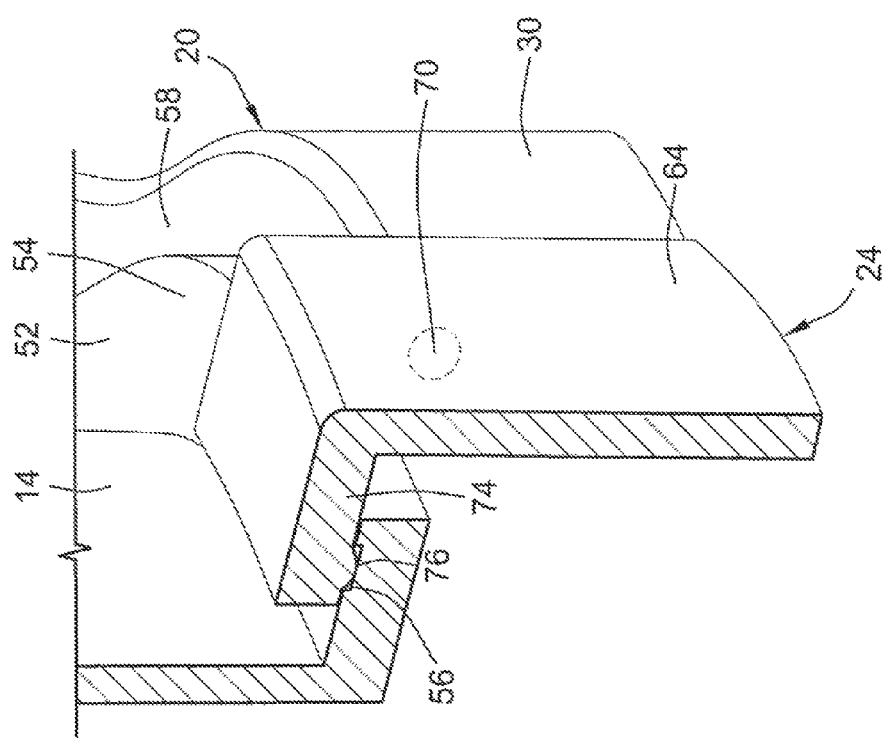
FIG. 13A
FIG. 13B

PORTABLE COUNTERTOP ELECTRIC OVEN

RELATED APPLICATIONS

The present application claims benefit under 119(e) of U.S. Provisional Patent Application No. 61/313,571, filed Mar. 12, 2010, the contents of which are incorporated herein by reference in their entirety, and is of common assignee to the present invention. The present invention is also a continuation-in-part of U.S. Nonprovisional patent application Ser. No. 11/987,487, filed Nov. 30, 2007, the contents of which are incorporated herein by reference in their entirety, and is of common assignee to the present invention. The present application is also related to the following design applications, U.S. Design patent application Ser. No. 29/357,546, filed Mar. 12, 2010, U.S. Design patent application Ser. No. 29/357,548, filed Mar. 12, 2010, and U.S. Design patent application Ser. No. 29/357,553, filed Mar. 12, 2010, the contents of which are incorporated herein by reference in their entirety, and is of common assignee to the present invention.

CROSS REFERENCE TO RELATED APPLICATIONS

The present application has subject matter related to U.S. Pat. No. 6,917,017, issued Jul. 12, 2005, U.S. Pat. No. 6,936,795, issued Aug. 30, 2005, U.S. Pat. No. 6,617,554, issued Sep. 9, 2003, and U.S. Pat. No. 6,201,217, issued Mar. 13, 2001, the subject of U.S. Ex Parte Reexamination application Ser. No. 90/009,775, filed Jul. 22, 2010, the contents of all of which are incorporated herein by reference in their entirety, and are of common assignee to the present invention.

BACKGROUND

1. Field

The present invention relates to electric ovens, and in particular to portable countertop electric cook ovens.

2. Related Art

Countertop electric ovens are an alternative to conventional ovens and offer a number of advantages. Countertop ovens may have quicker cooking times, and may be relocated within a kitchen area. Various known countertop ovens may include a power head having a heating unit that rests on top of a cooking enclosure. The power head may use an electric or infrared heating element in unison with a fan to cycle hot air around the interior of the cooking enclosure to cook the food. A heating pan and/or tray may fit inside the cooking enclosure to support the food as it cooks.

In many instances however, known countertop ovens require a user to use both hands when removing the power head. Two hands may also be necessary when relocating or transporting the unit. Additionally, many countertop ovens do not fixedly secure certain components of the oven to each other. Moreover, many electric ovens are designed to feature a relatively large, circular-shaped oven housing to accommodate larger food items. However, where only smaller food items are used, such large, circular designs may utilize more power than required to cook a smaller food item. For example, known countertop ovens may be upwards of 15 inches wide, 13 inches tall, and 12 inches in diameter; may weigh up to nine pounds; and feature power ratings that include 120 VAC/1225 W, 120 VAC/1500 W, 220 VAC/1500 W, and 230 VAC/1500 W.

Thus, it would be desirable to provide a portable countertop electric oven that is easy to use and transport. These and other needs are addressed by the below embodiments.

SUMMARY

Further features and/or advantages of, as well as the structure and/or operation of, various exemplary embodiments, are described in detail below with reference to the accompanying drawings.

In an exemplary embodiment, a portable countertop electric oven for cooking food is provided. The oven may include, in an exemplary embodiment: a cooking housing; a power head operative to attach, to connect, or to be coupled, directly or indirectly, to the cooking housing, at least a portion of the power head extending into an interior of the cooking housing; a base operative to attach, to connect, or to be coupled, directly or indirectly, to the cooking housing; and/or a first securing element operable to secure the cooking housing to the base.

In an exemplary embodiment, the portable countertop electric oven may further include an oven pan disposed to be placed in a central cavity of the base. It may further include a grill disposed to be placed in the oven pan.

In an exemplary embodiment, the portable countertop electric oven may include a porting element for mobility of the device. The porting element may be a handle formed from a portion of the power head. The portion of the power head may include first and/or second bulged regions of the power head.

In an exemplary embodiment, the power head is detachably connected to the cooking housing by a second securing element. The second securing element may include one or more raised lands operative to engage with one or more ramped tabs. The raised lands may be formed from a material including the power head, and/or the ramped tabs may be formed in a material including the cooking housing. The cooking housing may also form an open area between the base and/or the power head.

In an exemplary embodiment, at least one of: the cooking housing; the power head and/or the base, at least partially include a polycarbonate material, or other appropriate material. Also, at least one of: the cooking housing; the power head and/or the base, may have a substantially elliptical shape. In addition, the at least one of: the cooking housing; the power head; and/or the base, may include two bulged portions at respective distal ends thereof. The base may include two bulged portions, and/or a gap may be formed in the sidewall in the vicinity of the bulged portions of the base.

In an exemplary embodiment, the first securing element includes an attachment clip that includes a first region operable to engage with the cooking housing and/or a second region operable to engage with the base. The first region may include at least one of: one or more engagement teeth disposed to engage with corresponding one or more grooves of the cooking housing; and/or one or more grooves formed by the material of the first region disposed to engage with one or more rim portions of the cooking housing. Also, the second region may include at least one pin portion disposed to engage with one or more corresponding recessed groove portions of the base.

In yet another exemplary embodiment, a method of manufacturing a portable countertop electric oven for cooking food is provided. The method may include: producing a cooking housing; producing a power head operative to attach, to connect, or to be coupled, directly or indirectly, to the cooking housing, at least a portion of the power head extending into an interior of the cooking housing; producing a base operative to attach, to connect, or to be coupled, directly or indirectly, to the cooking housing; and/or producing a first securing element operable to secure, to connect, or to be coupled, directly or indirectly, the cooking housing to the base.

In an exemplary embodiment, at least one of: the cooking housing; the power head and/or the base, are produced to have a substantially elliptical shape. Also, at least one of: the cooking housing; the power head; and/or the base, may be produced to comprise two bulged portions at respective distal ends thereof.

BRIEF DESCRIPTION OF THE DRAWINGS

The foregoing and other features and/or advantages of the invention will be apparent from the following, more particular description of exemplary embodiments of the invention, as illustrated in the accompanying drawings. In the drawings, like reference numbers generally indicate identical, functionally similar, and/or structurally similar elements. A preferred exemplary embodiment is discussed below in the detailed description of the following drawings:

FIG. 10A is a cross-sectional view of the base and/or cooking enclosure of the example portable countertop electric oven with an attachment clip in a resting position.

FIG. 10B is an enlarged view of the groove that holds the attachment clip of FIG. 10A illustrating the position of a pin in the groove in the resting position.

FIG. 11A is a close-up view of the base and/or cooking enclosure of FIG. 10A with the attachments clip in a first stage of operation.

FIG. 11B is an enlarged view of the groove that holds the attachment clip of FIG. 11A illustrating the position of the pin in the first stage of operation.

FIG. 12A is a close-up view of the base and/or cooking enclosure of FIG. 10A with the attachment clip in a second stage of operation.

FIG. 12B is an enlarged view of the groove that holds the attachment clip of FIG. 12A illustrating the position of the pin in the second stage of operation.

FIG. 13A is a close-up view of the base and/or cooking enclosure of FIG. 10A with the attachment clip in a third and/or final stage of operation securing the cooking enclosure to the base.

FIG. 13B is an enlarged view of the groove that holds the attachment clip of FIG. 13A illustrating the position of the pin in the third and/or final stage of operation.

DETAILED DESCRIPTION OF VARIOUS EXEMPLARY EMBODIMENTS

The following detailed description of the preferred exemplary embodiment as well as various other exemplary embodiments, in conjunction with the accompanying claims and/or drawings describes the invention in which like numerals in the several views refer to corresponding or similar parts. The present invention broadly represents applicable improvements to an apparatus and/or methods relating to a portable countertop electric oven. The embodiments detailed herein are intended to be taken as representative or exemplary of those in which the improvements of the embodiments may be incorporated and are not intended to be limiting.

In exemplary embodiments, a portable countertop electric oven and/or method of assembly for a portable countertop electric oven are described herein.

Figure 1:
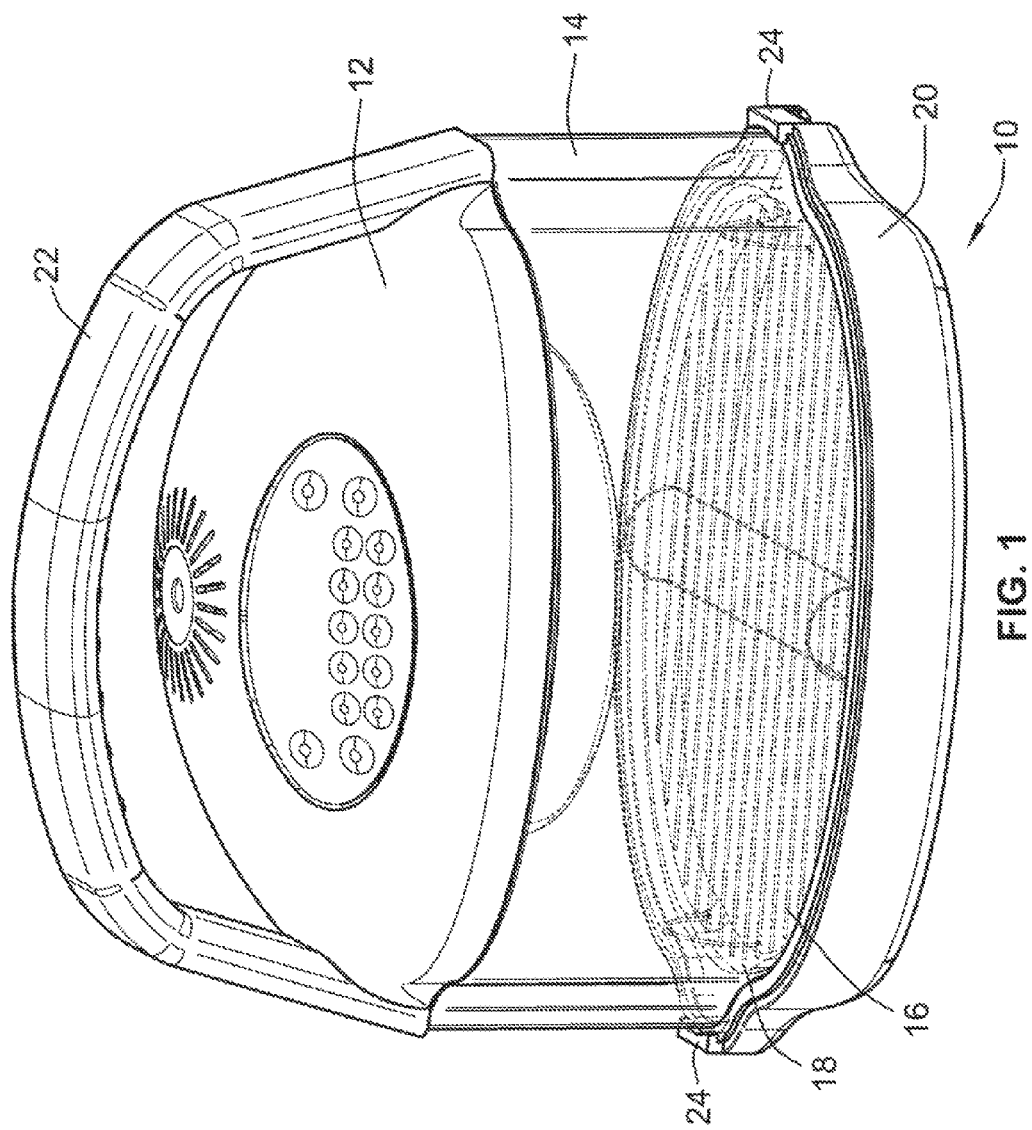
FIG. 1 is a perspective view of an example portable countertop electric oven.

With reference to FIG. 1, an example portable countertop electric oven 10 is shown. Oven 10 in the example shown includes a power head 12, a cooking housing 14, a cooking rack 16, an oven pan 18, and/or a base 20. As seen in FIG. 1, the power head 12 fits onto the cooking housing 14, and/or the cooking housing rests on the base 20 of the oven. As seen further in FIG. 1, the oven 10 includes features designed to improve the portability of the oven. A handle 22 is mounted to the power head 12; the power head is lockably connected to the cooking housing 14; and/or the base 20 includes attachment clips 24 that may snap onto the cooking housing to secure the cooking housing to the base. Thus, the components of the oven 10 may be locked together as a singular unit. As a result, a user may grasp the handle 22 of the oven with just one hand to transport the oven as a singular unit instead of having to use both hands to carry the oven or transport the components individually.

Figure 2:
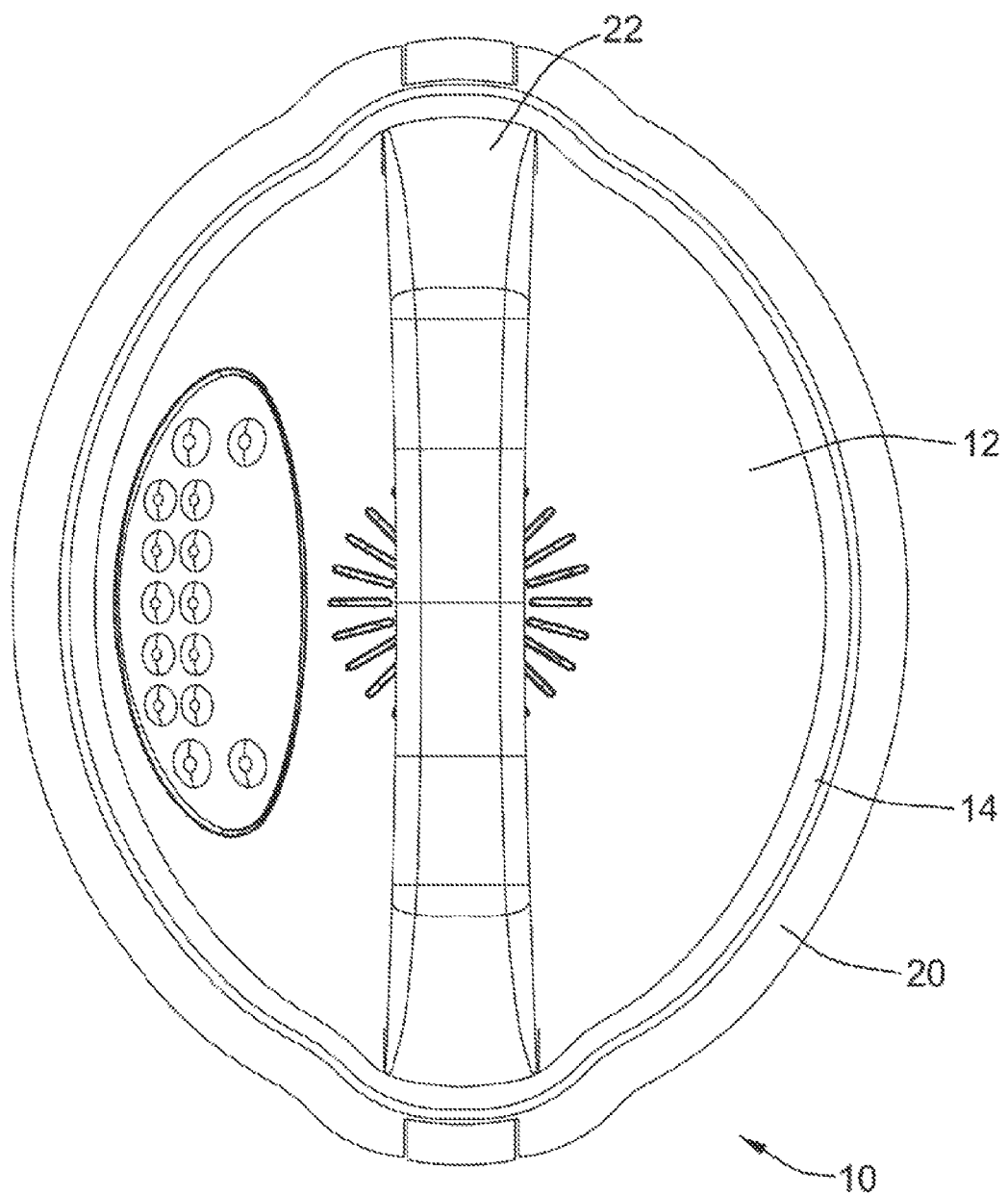
FIG. 2 is a top view of the example portable countertop electric oven of FIG. 1.

As seen in FIG. 1 and/or FIG. 2, the power head 12, cooking housing 14, and/or base 20 of the example oven 10 are substantially elliptical in shape. Thus, the power head 12, cooking housing 14, and/or base 20 are widest along their major axes. Oven 10, in the example shown, features the handle 22 positioned along the major axis of the power head 12. The elliptical shape of the components of the oven 10 also makes for a compact design that reduces the amount of energy needed to cook smaller food items.

Figure 3:
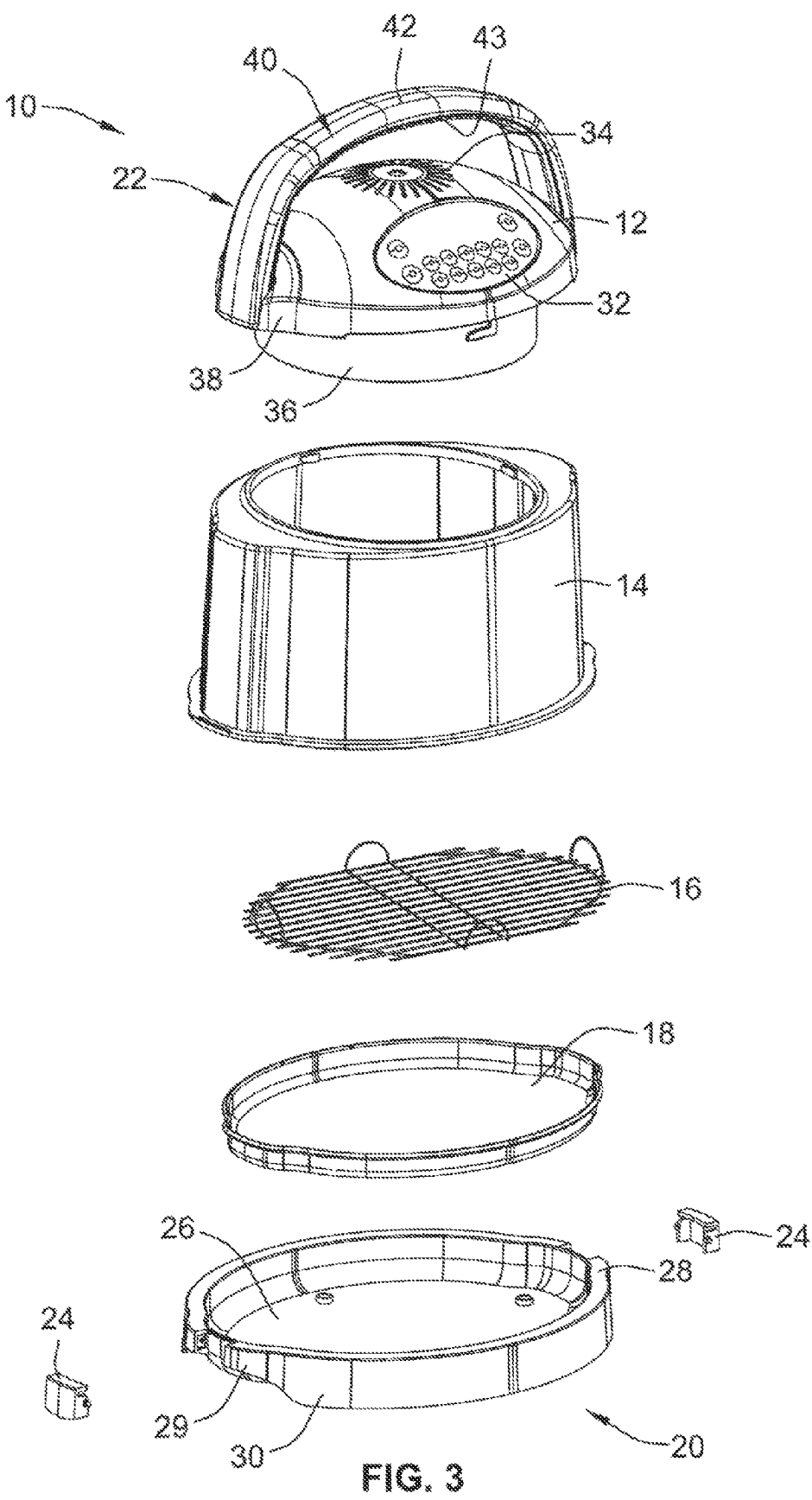
FIG. 3 is an exploded view of the example portable countertop electric oven of FIG. 1.

Referring now to FIG. 3, the power head 12 fits into and/or detachably connects to the cooking housing 14. The oven pan 18 rests in the central cavity 26 of the base 20, and/or the cooking rack 16 rests on top of the oven pan. The cooking housing 14 rests on an upper rim 28 formed at the periphery of the upper surface of the base 20. Further, attachment clips 24 are attached to (and/or connected to, and/or coupled to) and/or positioned at the side wall 30 of the base 20. As seen in the example exploded view of the portable countertop electric oven 10 in FIG. 3, the cooking rack 16 and/or the oven pan 18 are also substantially elliptical in shape to match the shape of and/or fit into the base 20.

The ability to heat food items with power head 12 may be similar to known power heads for countertop electric ovens. For further details of an example power head, reference may be made to U.S. Pat. No. 6,201,217 issued to Moon et al., the foregoing being incorporated herein by reference in its entirety. As seen, power head 12, in this example, includes a control panel 32 and/or air vents 34 positioned on the upper portion of the power head. The power head 12, in this example, includes a heating unit 36 attached, connected, and/or coupled to the bottom of the power head, which may extend into the cooking housing 14 of the oven 10.

In the example portable countertop electric oven 10 seen in FIG. 3, the power head 12 is substantially elliptical in shape and/or may include bulged portions 38 formed at the side of the power head. The power head 12 also includes a handle 22 attached, connected, and/or coupled to the power head. As seen in FIGS. 1-3, bulged portions 38 are positioned at either end of the major axis, the widest portion of the power head 12. The handle 22, in this example, similarly extends along the major axis of the power head 12 and/or attaches, connects, or couples, to the power head at bulged portions 38.

The handle 22 may be made of polycarbonate or other suitable material known to those skilled in the art. However, other exemplary embodiments may include materials such as, e.g., but not limited to, poly materials, plastics, glass, metals, nonmetals, conductors, nonconductors, insulators, polymers, silicone, or other materials as will be apparent to those skilled in the art, etc. The handle 22 may also include a grip 40 positioned on the handle. In the example power head 12 seen in FIGS. 1-3, the grip 40 is formed of rubber and/or positioned along the top portion 42 of the handle 22. Further, the grip 40 may include ridges 43 positioned on the underside of the grip to further improve gripability. Those skilled in the art will recognize that the grip 40 may be made of any material suitable for a handle grip.

Figure 4:
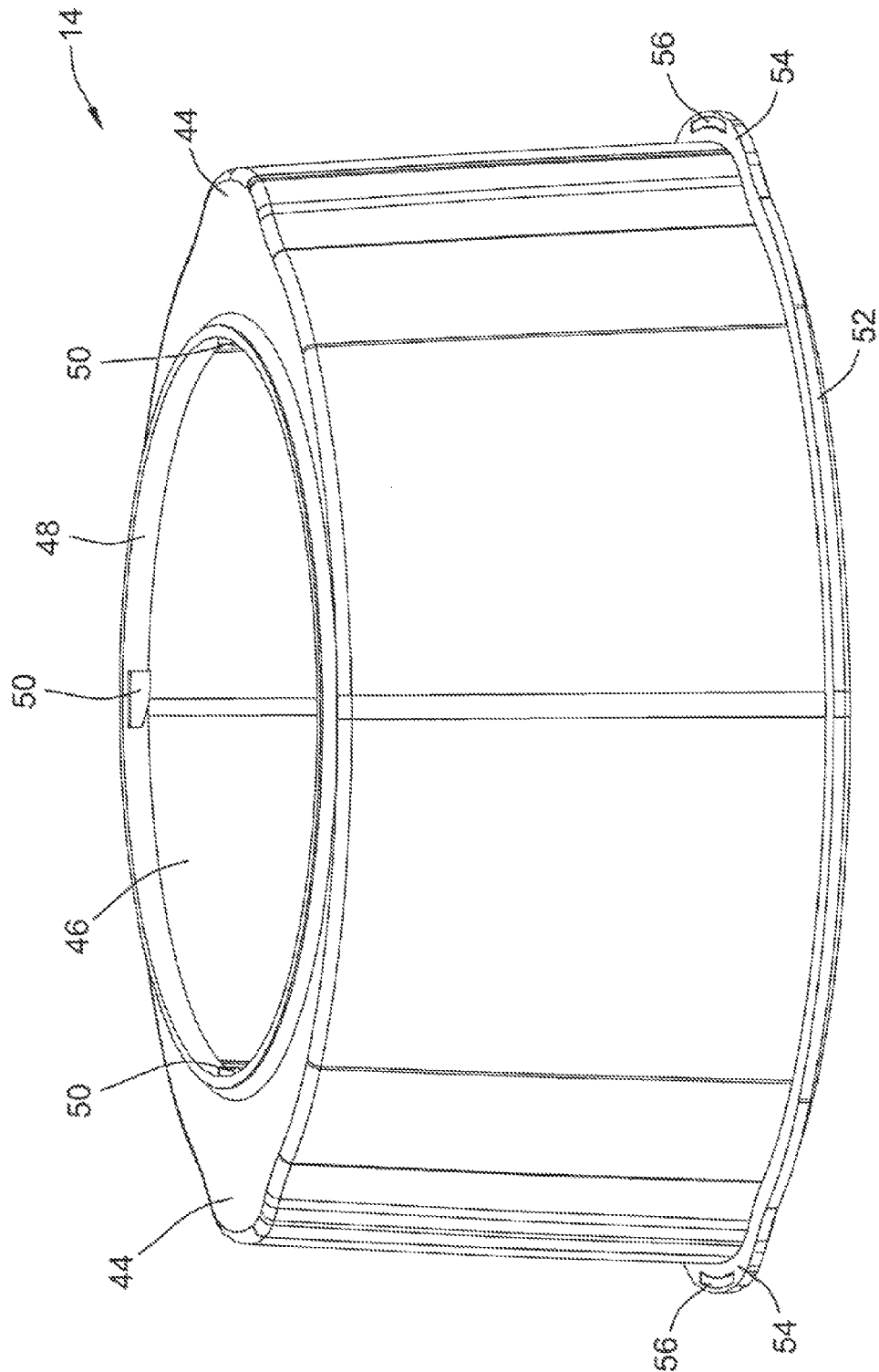
FIG. 4 is an example cooking housing for the portable countertop electric oven of FIG. 1.

Now referring to FIG. 4, the cooking housing 14 for the portable countertop electric oven 10 is shown. Like the power head, the example cooking housing 14 is substantially elliptical in shape having the widest portion of the cooking housing along the major axis. Also like the power head, the cooking housing 14 may include bulged portions 44 formed in the side of the cooking housing at either end of the major axis.

The cooking housing 14 may be made of transparent polycarbonate or other suitable material known to those in the art. However, other exemplary embodiments may include materials such as, e.g., but not limited to, poly materials, plastics, glass, metals, nonmetals, conductors, nonconductors, insulators, polymers, silicone, or other materials as will be apparent to those skilled in the art, etc. An opening 46 is formed in the upper surface of the example cooking housing 14 for receipt of the heating unit 36 of the power head 12 (FIG. 3). An annular lip 48 surrounds the opening 46, and/or one or more ramped tabs 50 may be formed on the interior of the lip to detachably connect the power head 12 (FIG. 3).

The example cooking housing 14 also includes a rim 52 having a substantially elliptical shape that surrounds the base of the cooking housing 14. In the example cooking housing 14 seen in FIG. 4, the rim 52 is a flat lip that surrounds the base of the cooking housing 14. The rim 52 of the example cooking housing 14 may similarly include bulged portions 54 formed at either end of the major axis of the cooking housing that correspond with bulged portions 44 of the cooking housing. The rim 52 of the cooking housing 14 may be used to secure the cooking housing to the base 20 of a portable countertop electric oven 10 (FIG. 3).

The rim 52 of the cooking housing 14 includes a securing member 56. Securing member 56, in this example, may be a recess such as an arched groove 56 formed at the bulged portions 54 of the rim 52 as seen in the example cooking housing 14 of FIG. 4. Additional securing members 76 (FIG. 8) are provided on the attachment clip 24 to securely attach, connect, and/or couple, the cooking housing 14 to the base 20 of the oven 10 (FIG. 1). The additional securing members 76 (FIG. 8), in this example, may be projections formed on the attachment clip 24 that correspond with and/or engage the arched groove 56 on the rim 52 of the cooking housing 14. As described below, the rim 52 of the cooking housing 14 may be used to rest the cooking housing 14 on the base 20 of a portable countertop electric oven 10 (FIG. 3), and/or the grooves 56 in the rim 52 may be used to engage the securing members 76 of the attachment clips 24.

Figure 5:
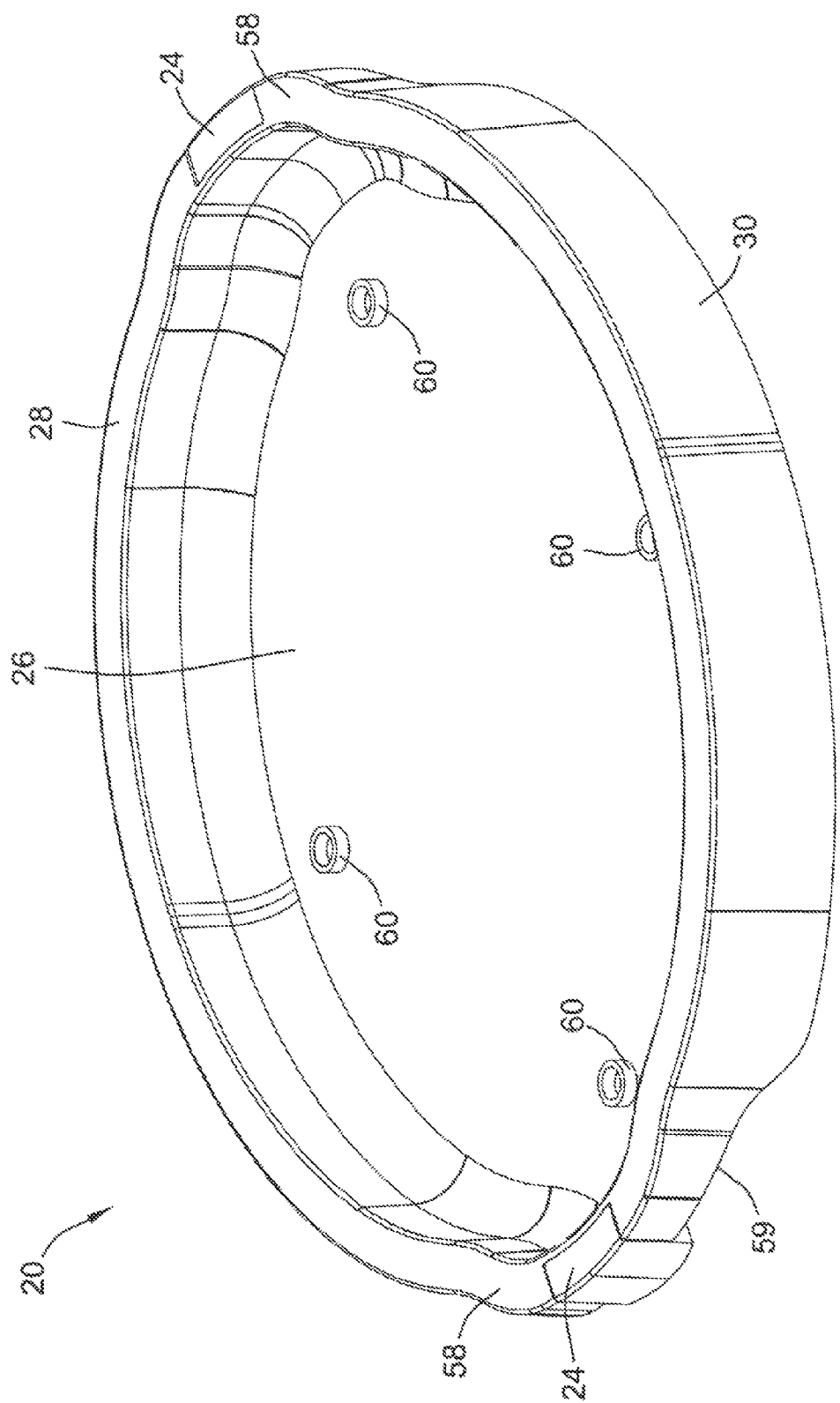
FIG. 5 is a perspective view of an example base of the portable countertop electric oven of FIG. 1.

Referring now to FIG. 5, base 20 for the portable countertop electric oven 10 is shown. As seen in FIG. 5, the base 20 is also substantially elliptical in shape having the widest portion of the base along the major axis. Similarly, the base 20 may have bulged portions 58 formed in the side wall 30 of the base at either end of the major axis.

The base 20 may be made of polycarbonate or any other suitable material known to those in the art. However, other exemplary embodiments may include materials such as, e.g., but not limited to, poly materials, plastics, glass, metals, nonmetals, conductors, nonconductors, insulators, polymers, silicone or other materials as will be apparent to those skilled in the art, etc. The base 20 may also include one or more gaps 59 formed in the side wall 30 of the base. The gaps 59 are designed to provide an open space and/or allow a user to grasp the base 20 when lifting the unit. The gaps 59 also allow a user to manipulate the attachment clips 24 when securing the cooking housing 14 to the base 20 (FIG. 3).

As seen in FIG. 5, the base 20, in this example, includes an arcuate gap 59 formed in the side wall 30 and/or at each bulged portion 58 of the base. The side wall 30 of the base 20 tapers upwards at the bulged portions 58 creating the gaps 59 between the bottom of the side wall and/or the countertop (not shown). Users may insert their fingers through the gaps 59 to grasp, lift, or carry the example base 20. Additionally, the gap allows users to manipulate the attachment clip upwards and/or downwards when securing the cooking housing 14 to the base 20 (FIG. 3). Moreover, the gaps 59 allow the attachment clips 24 to pivot, as described below, when attaching the clip to or detaching the clip from the cooking housing 14.

The example base 20 also includes a central cavity 26 for receipt of the oven pan 18 and/or cooking rack 16 (FIG. 3). The central cavity 26 may include one or more support columns 60 to support the oven pan 18 (FIG. 3). A support column 60 may be made of polycarbonate or any other suitable material known to those in the art. However, other exemplary embodiments may include materials such as, e.g., but not limited to, poly materials, plastics, glass, metals, nonmetals, conductors, nonconductors, insulators, polymers, silicone or other materials as will be apparent to those skilled in the art, etc. The support column 60 may also include rubber feet (not shown) attached to the top of the support column. The base 20 further includes an upper rim 28 formed at the periphery of the upper surface of the base. The upper rim 28 of the base 20 may be used to support the cooking housing 14 via the rim 52 of the cooking housing (FIG. 4).

Attachment clips 24 may be positioned in the base 20 of the portable countertop electric oven. As described further below, the attachment clips 24 may be used to secure the cooking housing 14 to the base 20 of the portable countertop electric oven 10 (FIG. 1). As seen in FIG. 5, the attachment clips 24 are mounted in the side wall 30 and/or at the bulged portions 58 of the base. When the attachment clips 24 are not engaged, the clips rest within the respective bulged portions 58 of the base 20 and/or are flush with the rim 28 of the base. Alternatively, the attachment clips 24 may selectively be placed at any other location on or in the base to secure the cooking housing 14 to the base 20 (FIG. 3).

Figure 6:
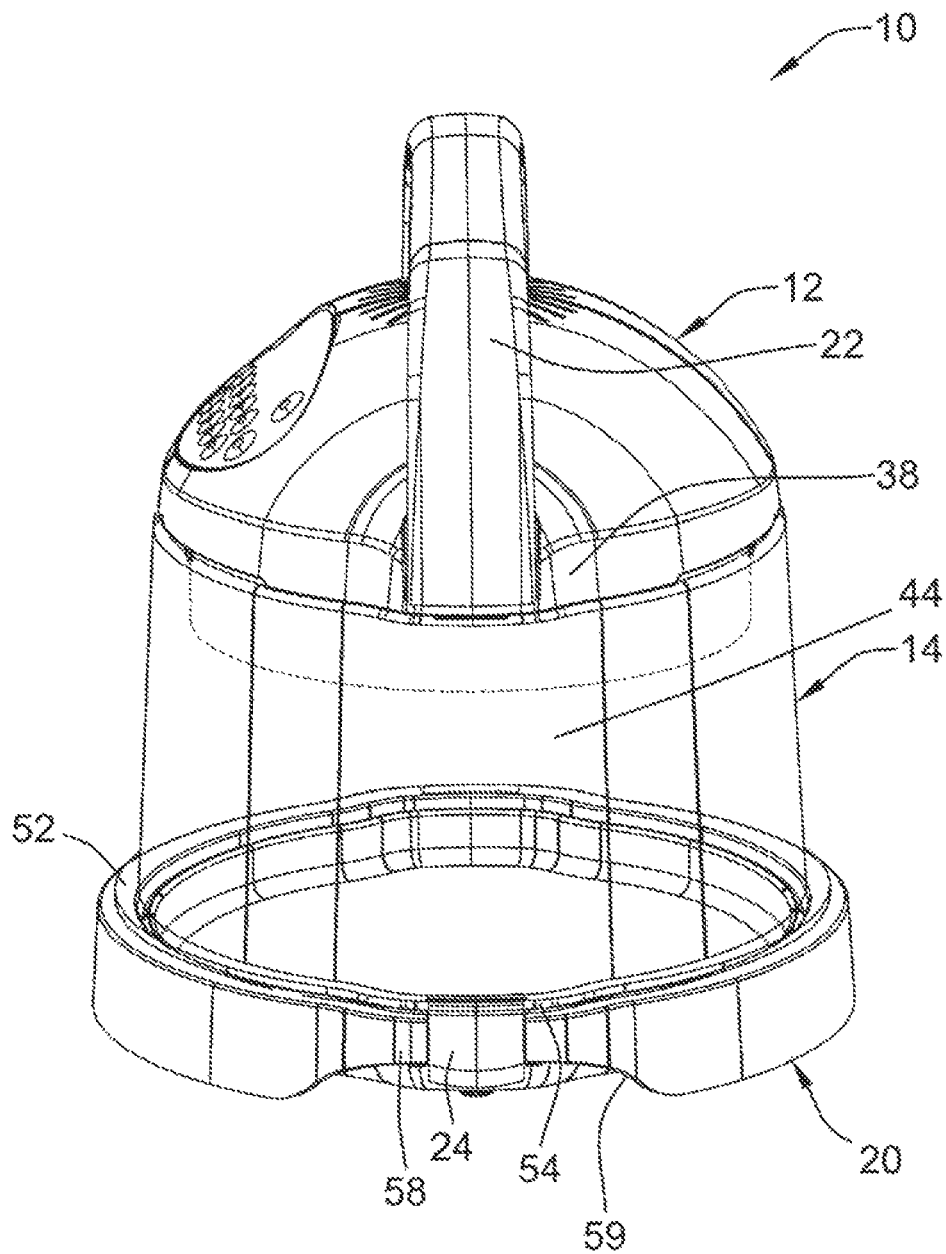
FIG. 6 is a top-side view of the example portable countertop electric oven of FIG. 1.

Referring now to FIG. 6, a top-right view of the portable countertop electric oven 10 is shown. As seen in FIG. 6, the oven 10 is assembled, and/or the visible attachment clip 24 is securing the cooking housing 14 to the base 20 of the oven. Also seen in the example oven 10 of FIG. 6, the handle 22, the attachment clip 24, respective bulged portions 38, 44, 54 and/or 58 of the power head 12, cooking housing 14, cooking housing rim 52, and/or base 20 are all in alignment down the side of the example oven.

Figure 7A:
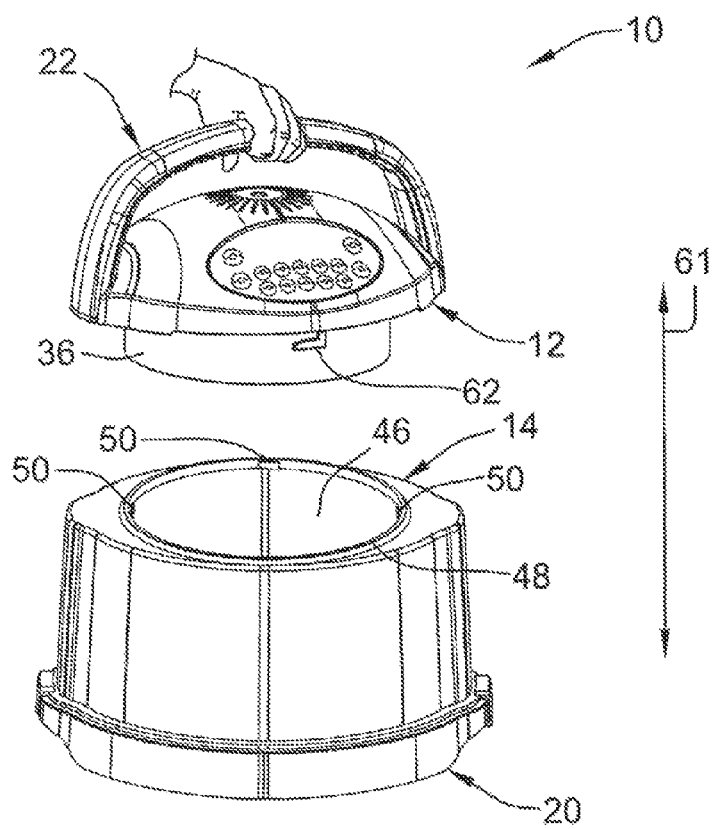
FIG. 7A is a perspective view illustrating a power head of the example portable countertop electric oven ready to be inserted into the cooking housing.
Figure 7B:
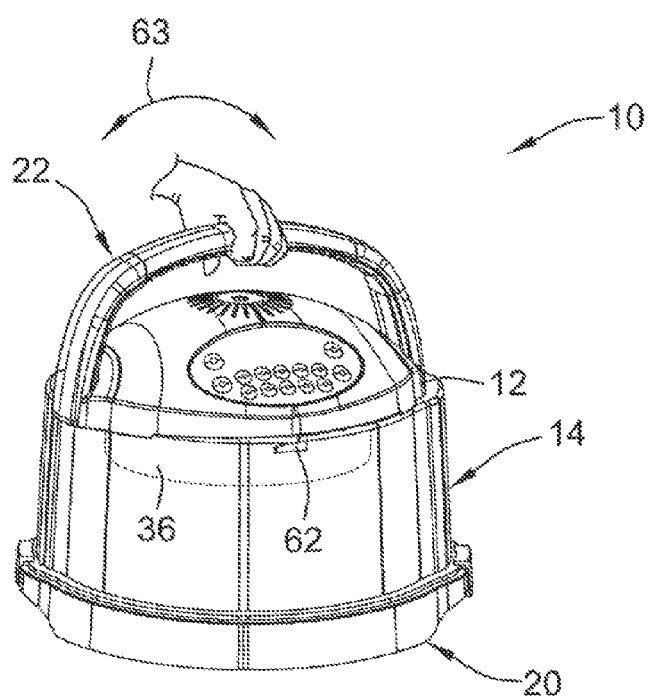
FIG. 7B illustrates the power head of the example portable countertop electric oven of FIG. 7A inserted into and/or ready to be rotated into locked engagement with the cooking housing of the oven.
Figure 7C:
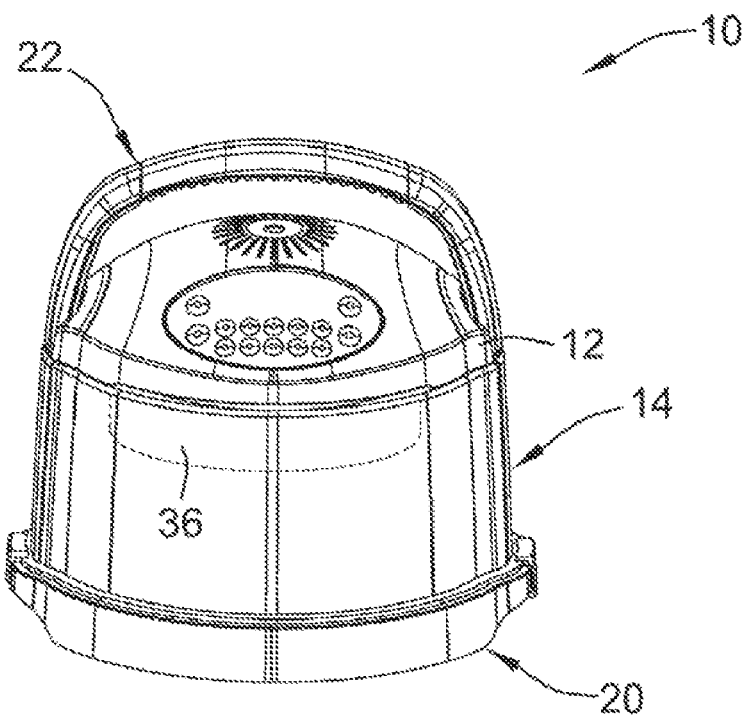
FIG. 7C illustrates the power head of an example portable countertop electric oven of FIG. 7A rotated into locked engagement with the cooking housing.

Now with reference to FIGS. 7A-7C, the attachment of the power head 12 to the cooking housing 14 is shown. The portable countertop electric oven described herein allows a user to attach and/or detach the power head with one hand via the handle of the power head. As seen in FIG. 7A, the example cooking housing 14 includes equally spaced ramped tabs 50 that correspond with equally spaced raised lands 62 on the exterior of the heating unit 36. A user may grasp the handle 22 of the power head 12 to position the power head over the cooking housing 14. The power head 12 may be positioned at an angle so that the raised lands 62 are not aligned with the ramped tabs 50 of the cooking housing 14. As shown by arrow 61, a user may use the handle 22 to lower the power head 12 onto or lift the power head off of the cooking housing 14. The user may lower the power head 12 via the handle 22 and/or insert the heating unit 36 through the opening 46 of the cooking housing 14. The bottom of the power head 12 engages the annular lip 48 of the cooking housing 14 as the power head comes to rest on the cooking housing as seen in FIG. 7B.

Also as seen in FIG. 7B, the power head 12 is initially positioned on the cooking housing at an angle. In this angled position, the raised lands 62 have not yet engaged the ramped tabs 50 of the cooking housing 14 to lock the power head 12 to the cooking housing. As shown by arrow 63, a user may use one hand to rotate in a clockwise direction the power head 12 via the handle 22 into a locked engagement with the cooking housing 14. Rotating the power head 12 causes the ramped tabs 50 of the cooking housing 14 to engage the raised lands 62 of the heating unit 36 and/or lock the power head into a final position as seen in FIG. 7C.

To detach the power head 12, the actions are reversed. A user may grasp the handle 22 of the power head 12 with one hand and/or, using only one hand, rotate the power head in a counterclockwise direction as shown by arrow 63 to disengage the raised lands 62 from the ramped tabs 50. Once the raised lands 62 are disengaged from the ramped tabs 50, a user may use one hand to lift the power head 12 off of the cooking housing 14.

It should be noted that the attachment device comprising raised lands 62 and/or ramped tabs 50 is used for exemplary purposes only, and/or not by way of limitation. In fact, the attachment device may comprise a separate unit, or may comprise the entirety of any other components or portions thereof, including for example, power head 12, cooking housing 14, cooking rack 16, oven pan 18 and/or base 20.

Figure 8:
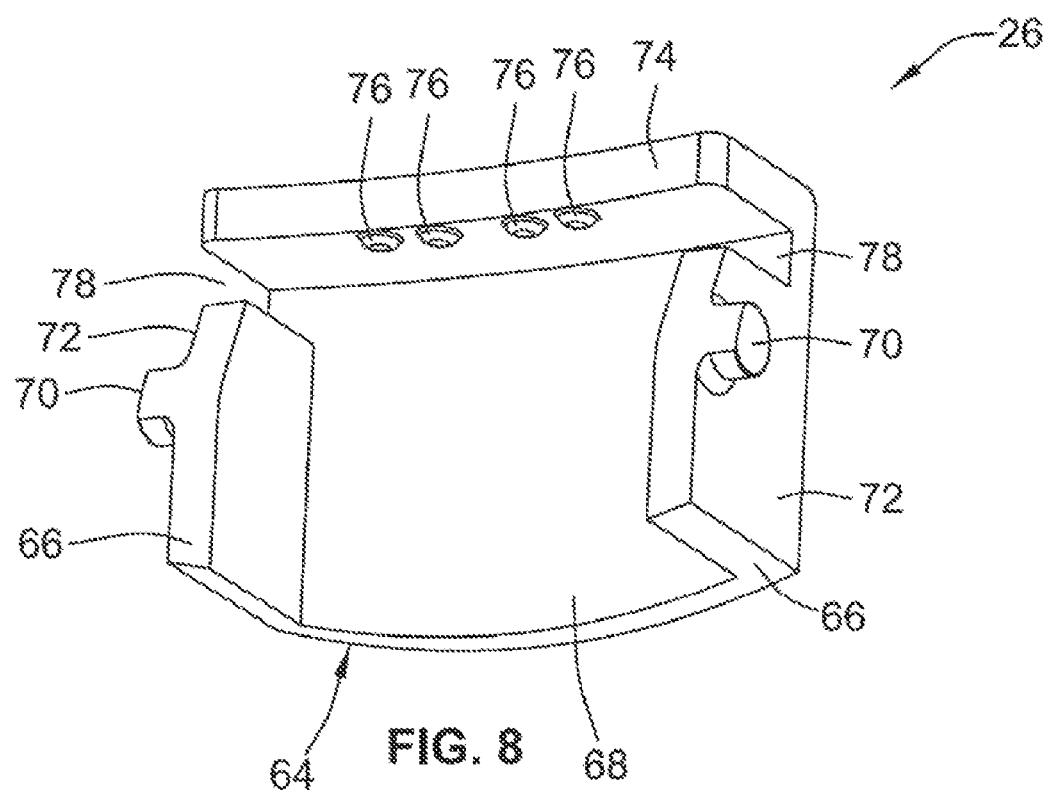
FIG. 8 is a perspective view of an example attachment clip for the portable countertop electric oven of FIG. 1.

Referring now to FIG. 8, an example attachment clip 24 is shown. The example attachment clip 24 includes a rectangular back panel 64 having a slight arch shape. The example attachment clip 24 also includes a pair of side arms 66 positioned on either side and/or attached to the interior face 68 of the back panel 64. The pair of side arms 66 are substantially perpendicular to the back panel 64 of the example attachment clip 24.

Each side arm 66 further includes a mounting member 70 attached to the arm. The mounting member 70 is used to mount the attachment clip to the base at a corresponding mounting member 84 in the base as described below. The mounting member of the side arms 66, in the example may be a pin 70 attached to and/or extending away from the outer face 72 of the arm. The pin 70 is perpendicularly attached to each arm 66 and/or is substantially parallel with the back panel 64 of the example attachment clip 24.

The attachment clip 24, in this example, also includes a top arm 74 attached to and/or extending away from the top of the back panel 64. The top arm 74 is also substantially perpendicular with the back panel 64. As discussed above in reference to FIG. 4, the attachment clip 24 may include at least one securing member 76 that engages a corresponding securing member 56 formed in the cooking housing 14 (FIG. 4). In this example, the securing members 76 of the attachment clip 24 may be projections such as domed-shaped teeth 76 positioned on the lower surface of the top arm 74 as seen in FIG. 8. The dome-shaped teeth correspond with and/or may engage the arched groove 56 formed on the rim 52 of the cooking housing 14 (FIG. 4).

The attachment clip 24 further includes an engagement member 78 used to secure the cooking housing 14 of the oven to the base 20 (FIG. 1). As seen in FIG. 8, the engagement member, in the example shown, may be a C-shaped groove 78 formed in the attachment clip 24 between the side arms 66 and/or the top arm 74 for receipt of the rim 52 of the cooking housing 14 (FIG. 4). As described below, the attachment clip 24 may engage the rim 52 of the cooking housing 14 (FIG. 4) by receiving the rim in the groove 78 of the example attachment clip 24 and/or having the teeth 76 of the top arm 74 engage the groove 56 formed in the rim (FIG. 4). Alternative clips, clasps, or other suitable securing structures may selectively be used to secure the attachment clip to the cooking housing.

Figure 9:
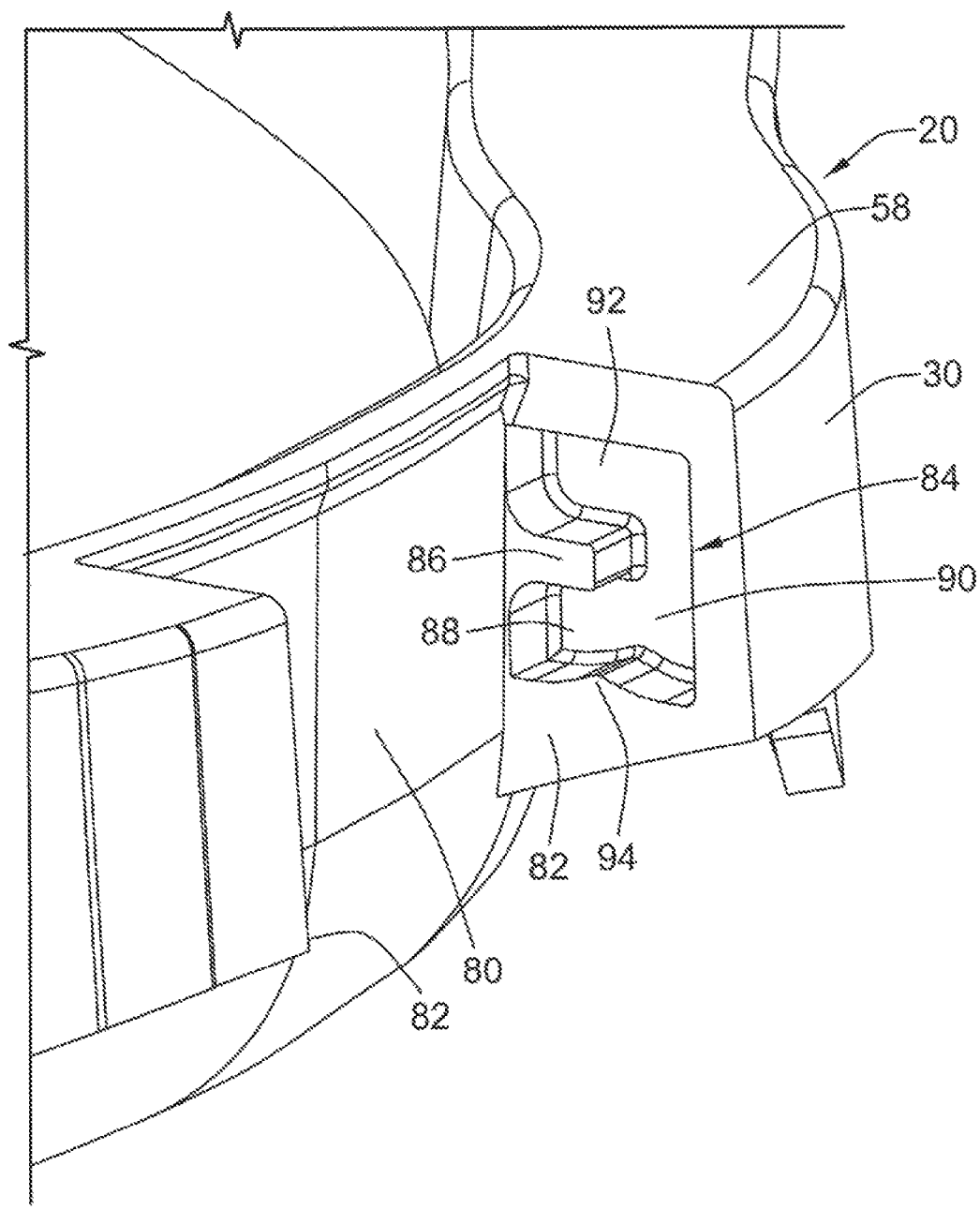
FIG. 9 is an enlarged fragmentary section view of the base of the example portable countertop electric oven illustrating a groove that holds an attachment clip.

Now referring to FIG. 9, a close-up view of a fragmented section of the base 20 of the portable countertop electric oven 10 is shown. As mentioned above, the base 20 includes corresponding mounting members 84 for mounting the attachment clips 24 (FIG. 8). As seen in FIG. 9, the corresponding mounting members 84, in this example, may be recesses 84 respectively formed on the interior walls 82 of a cutout 80 formed in the bulged portion 58 of the base 20. Each recess 84 includes a guide partition 86 that divides the recess into a non-engagement chamber 88, a movement channel 90, and/or an engagement chamber 92. The bottom of the recess is antiform in shape forming an anticline 94 between the non-engagement chamber 88 and/or the movement channel 90. The anticline 94 ensures the pin 70 of an attachment clip 24 (FIG. 8) remains in the non-engagement chamber 88 when not in use. As described below, the pin 70 of an attachment clip 24 (FIG. 8) moves through the non-engagement chamber 88, the movement channel 90, and/or the engagement chamber 92 when respectively attaching and/or detaching (and/or connecting/disconnecting, and/or coupling/decoupling) the attachment clip to and/or from the rim 52 of a cooking housing 14 (FIG. 4).

The movement and/or operation of an example attachment clip 24 is illustrated in FIGS. 10A, 10B, 11A, 11B, 12A, 12B, 13A and/or 13D. As seen in FIGS. 10A, 10B, an example attachment clip 24 rests in a non-engaged position with the pins 70 of the attachment clip resting in the non-engagement chamber 88 of the recess 84. As seen in this example, the attachment clip 24 is flush with the upper rim 28 of the base 20 of the example portable countertop electric oven 10. To begin the operation, a user may push the bottom portion of the attachment clip 24 towards the base 20 of the oven 10.

As seen in FIGS. 11A, 11B, the attachment clip 24 will pivot about the pins 70, the top portion of the attachment clip will move away from the base 20, and/or the pins will move across the anticline 94 from the non-engagement chamber 88 into the movement channel 90 of the recess 84. The user may then pull the attachment clip 24 upwards causing the pins 70 to rise through the movement channel 90 of the recess 84.

As shown in FIGS. 12A, 12B, a user may pull the attachment clip 24 upward until the groove 78 of the attachment clip aligns with the rim 52 of the cooking housing 14 and/or the pins 70 of the attachment clip align with the engagement chamber 92 of the recess 84. The user may then push the top portion of the attachment clip 24 towards the base 20 and/or the cooking housing 14 of the oven 10.

As seen in FIGS. 13A, 13B, as the user pushes the attachment clip 24 towards the cooking housing 14, the groove 78 of the attachment clip receives the rim 52 of the cooking housing. Further, the pins 70 of the attachment clip 24 move from the movement channel 90 into the engagement chamber 92 of the recess 84. As the groove 78 of the attachment clip 24 receives the rim 52 of the cooking housing 14, the teeth 76 of the top arm 74 engage the groove 56 (FIG. 4) formed in the rim 52 of the cooking housing 14 thus securing the attachment clip to the cooking housing. With both attachment clips and/or the power head secured to the cooking housing, a user may use one hand to transport the oven as a singular unit.

To detach the attachment clip 24 from the cooking housing 14, a user may perform a similar set of actions. A user may push the bottom portion of the attachment clip 24 towards the base 20 of the oven 10 to pivot the clip about the pin 70 and/or respectively disengage the teeth 76 and/or groove 78 of the attachment clip from the groove 56 (FIG. 4) and/or rim 52 of the cooking housing 14 respectively. The pin 70 of the attachment clip 24 will move from the engagement chamber 92 into the movement channel 90 of the recess 84. The user may then pull the attachment clip 24 downwards through the movement channel 90 until the pin 70 aligns with the non-engagement chamber 88 of the recess 84. Finally, the user may push the top portion of the attachment clip 24 towards the base 20 of the oven 10 to push the pin 70 of the attachment clip from the movement channel 90, across the anticline 94, and/or into the non-engagement chamber 88 to return the attachment clip to a resting position.

It is important to note that the attachment clip 24 need not be a separate unit, but rather may comprise the entirety of any other components or portions thereof, including for example, power head 12, cooking housing 14, cooking rack 16, oven pan 18 and/or base 20. For example, attachment clip 24 may comprise a portion of cooking housing 14 and/or a portion of base 20.

The portable countertop electric oven provided herein provides many advantages. The improved countertop electric oven allows a user to remove the power head with just one hand by providing a handle to apply the necessary torque. The handle further allows the user to transport the unit with just one hand, and/or the attachment clips ensure the detachable parts of the device remain attached while in transport. Thus, ease of assembly and/or manipulation for the countertop electric ovens are provided.

The oval shape of the portable countertop electric oven also provides advantages over known countertop electric ovens. By providing a cooking enclosure with an oval shape, the portable countertop electric oven reduces the overall volume of the cooking enclosure. For example, the portable countertop oven may include a cooking housing that provides approximately 350 cubic inches of cooking space. A smaller cooking housing volume requires less energy to sufficiently heat the cooking enclosure. For example, the portable countertop oven may feature power ratings lower than known countertop ovens, such as 120 VAC/800 W. As a result, less energy may be used to cook food of a particular size than would be required for a countertop electric oven having a circular-shaped cooking housing. Further, the portable countertop oven may feature weights and/or dimensions less than known countertop ovens. For example, the portable countertop oven may have a weight of approximately 5.6 pounds and/or may be approximately 11.5 inches in height, approximately 11 inches in length, and/or approximately 9.5 inches in width. Thus improved portability and/or ease of storage are also provided.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and/or many details have been set forth for purposes of illustration, it will be apparent to those skilled in the art that the invention is susceptible to additional embodiments and/or that a certain of the details described herein can be varied considerably without departing from the basic principles of the invention.

Exemplary Components of Exemplary Embodiments of the Portable Countertop Oven

U.S. Pat. No. 6,201,217, (hereafter "the'217 patent") the contents of which are incorporated herein by reference in their entirety, of common assignee to the present invention, sets forth an exemplary countertop oven and includes various exemplary features, which in certain exemplary embodiments may be included in exemplary portable countertop ovens according to exemplary embodiments. With reference to FIGS. 1 and 2 of the '217 patent, according to an exemplary embodiment may include, a counter-top electric oven, which may include a base, an oven pan which may be supported by the base, a cooking rack, which may be supported by the oven pan, a generally cylindrical, transparent oven housing may be supported by the base, and a power head may be supported on the oven housing and may be detachably connected, attached, and/or coupled to the oven housing, in exemplary embodiments. Together, according to an exemplary embodiment of the '217 patent an oven may include, an oven pan and an oven housing. In an exemplary embodiment a cooking enclosure may include an upper housing, and a lower pan portion of various well known rigid materials such as, e.g., but not limited to, glass, metal, plastic, resilient material, etc. Exemplary embodiments of the portable oven may incorporate various elements depicted in the '217 patent, according to an exemplary embodiment, which may include various features in the assembled state shown in FIG. 1 of the '217 patent, according to an exemplary embodiment.

As shown in FIGS. 2 and 3 of the '217 patent, according to an exemplary embodiment, exemplary embodiments of the portable countertop oven may include, the base, which may have an interior surface, a generally cylindrical (e.g., but not limited to, and elliptical, circular, or other geometric shape, cylindrical) side wall and at least a partially, substantially planar bottom. A pair of handles of the '217 patent, according to an exemplary embodiment, exemplary embodiments of the portable countertop oven may include extending from the cylindrical side wall to allow a user to move the oven from one location to another, in an exemplary embodiment, these handles may be in addition to, or in place of the handle shown in the exemplary drawings of the exemplary portable oven, of exemplary embodiments. The interior surface may at least partially surround, or at least support, the oven pan and may be spaced from the oven pan in an exemplary embodiment, by an air gap. The base, may further include, in exemplary embodiments one or more support for the oven pan and may include, in an exemplary embodiment, one or more thermal insulators, which may be between the one or more supports and the oven pan to prevent overheating of the base in exemplary embodiments, by the heat from the oven pan, or other heating and/or heated components. In an exemplary, but nonlimiting embodiment, as shown in FIGS. 2 and 3 of the '217 patent, according to an exemplary embodiment, exemplary embodiments of the portable countertop oven may include one or more supports which may be provided in, e.g., but not limited to, an exemplary form of e.g., but not limited to, one, two, three, or more, e.g., cylindrical pillars, and one or more thermal insulating spacers may be provided in the form of, e.g., one, two, three, or more cylindrical spacers, which each may be supported by one or more of the pillars, in an exemplary embodiment. As may be seen in the section view of the exemplary spacer of the '217 patent, according to an exemplary embodiment, exemplary embodiments of the portable countertop oven may include a pillar, such as shown in FIG. 3 of the '217 patent, according to an exemplary embodiment, exemplary embodiments of the portable countertop oven may include spacers, which may include an exemplary cylindrical stub that may be engaged in an exemplary mating hole, or the like, in each exemplary pillar, which may retain the exemplary spacer(s) to a respective exemplary pillar. While exemplary cross-sections of exemplary spacers and exemplary pillars may be generally circular, oval, elliptical, or the like, it should be understood that the invention may contemplates non-circular cross-sections, such as, for example, but not limited to triangular, oval, square, rectangular, trapezoidal, hexagonal, etc. Any of these exemplary components may also be deemed optional features, not included in all exemplary embodiments of the present invention. The exemplary oven pan may in some exemplary embodiments be supported on e.g., but not limited to, insulators or the like to maintain an exemplary, but not required air gap between the exemplary interior surface and the cooking pan and may prevent in exemplary embodiments, overheating of the exemplary base or support, including the exemplary handle(s) according to exemplary embodiments. In exemplary embodiments, the base may be of metallic, plastic, glass, or other well known suitable resilient material, and in exemplary embodiments of embodiments sharing some features with the '217 patent, may according to an exemplary embodiment, be incorporated in an exemplary embodiment of the portable countertop oven, and may include an exemplary at least partially plastic base, which may be made, at least in part, by any suitable material, such as, e.g., but not limited to, exemplary poly, glass, metallic, and/or polycarbonate, etc., material and exemplary thermal insulators may be made from any of various well known suitable materials, such as, e.g., but not limited to, exemplary silicone rubber or other exemplary insulating material.

The oven pan of the '217 patent, according to an exemplary embodiment may be formed of e.g., but not limited to, exemplary glass, plastic, Teflon, metal, or other rigid material, may include exemplary embodiments of the portable countertop oven which may include exemplary interior surface(s) and exemplary exterior surface(s), as may be formed by one or more, well known, exemplary circular, oval, elliptical, or other shaped, dish, saucer, bowl or other exemplary portions, which may include at least a partially exemplary cylindrical side wall and/or exemplary at least partially planar bottom. In some exemplary embodiments, an exemplary oven pan may be a one, or more piece construction made of, e.g., but not limited to, exemplary glass, metallic, polymer, etc, exemplary aluminum plate with an exemplary suitable coating, such as, e.g., but not limited to, exemplary nonstick PTFE or other coating on at least a portion of an exemplary interior, or exterior surface. An exemplary pair of exemplary retractable optional handles may or may not be mounted or otherwise incorporated into an exemplary but non-limiting optional lip that may be incorporated in an exemplary, but nonlimiting at least partially outer or inner periphery of an exemplary pan. The exemplary one or more optional handles, of one embodiment may be mounted to or otherwise coupled to the exemplary lip for exemplary optional movement between a first exemplary position, such as, e.g., but not limited to, as shown in FIG. 2 of the '217 patent, according to an exemplary embodiment, exemplary embodiments of the portable countertop oven may include, where the optional handles may be extended from the exemplary lip so that a user may grasp the exemplary handles to, e.g., but not limited to, move, adjust, and/or remove one or more of the exemplary pan, and or base relative to an exemplary first position, and/or an exemplary second or more position, as shown in FIG. 4 of the '217 patent, according to an exemplary embodiment, where exemplary embodiments of the portable countertop oven may include, e.g., but not limited to, where the optional handle(s) may be, e.g., retracted toward exemplary optional lip to allow the exemplary oven housing, or other exemplary portion of the exemplary oven to be positioned at least partially above, or below the oven pan, as shown in exemplary FIG. 3 of the '217 patent, according to an exemplary embodiment, where exemplary embodiments of the portable countertop oven may include, embodiments which may avoid, e.g., interfering with the exemplary optional handles. As may be seen in FIG. 4 of the '217 patent, according to an exemplary embodiment, exemplary embodiments of the portable countertop oven may include, exemplary optional handle or handles which may have an exemplary pair of exemplary legs, which may extend from one or more exemplary grasping members. Each of the exemplary legs may be received in an exemplary, but nonlimiting, vertical and/or horizontal guide hole, which may be formed in the exemplary optional lip to guide the exemplary optional handle(s) between any of the first, second or more exemplary positions. Each of the exemplary optional leg(s) may terminate in an exemplary tab that may in an exemplary embodiment, engage the exemplary optional lip with the handle in the first or other position. The handle(s) may be made from any suitable, unitary or otherwise piece of material such as, e.g., but not limited to, metallic wire, or other material, etc., that may be formed, and/or bent to form the exemplary grasping member(s), the exemplary optional leg(s), and/or the exemplary or optional tab(s).

The exemplary cooking rack may include, in an exemplary embodiment an exemplary at least partially planar grid or other support for supporting, e.g., but not limited to, food items or other material that are being cooked, heated, warmed, etc., an exemplary first, only, or one of more set of exemplary loop or other shaped exemplary projections may extend in one or more direction(s) from the at least partial plane of the exemplary grid and an exemplary second, or more, set of loop or otherwise exemplary projection(s) may extend in, e.g., but not limited to, exemplary opposite direction from the at least partial plane of the exemplary grid. The exemplary projections can, in an exemplary embodiment, be used to support the exemplary grid to provide an exemplary first cooking height for exemplary food items supported by the exemplary grid, while the projections can be used to support the grid to provide an exemplary second or more cooking height for the exemplary grid. In one exemplary embodiment, the exemplary cooking rack may be made from any suitable material, such as, e.g., but not limited to, stainless steel with a suitable, exemplary non-stick PTFE coating.

As seen in FIG. 3 of the '217 patent, according to an exemplary embodiment, exemplary embodiments of the portable countertop oven may include, an oven housing, which may include in exemplary embodiments one or more interior surfaces, an at least partially, exemplary, generally cylindrical side wall that may blend into an exemplary generally conical or other shaped side wall, which in turn may blend into one or more exemplary at least partially planar upper wall, which may in an exemplary embodiment blend into one or more generally cylindrical or annular, ring(s). An exemplary optional annular lip may be formed on one or more of the at least partially exemplary outer surface(s) of the exemplary wall and may serve to support at least in part the exemplary oven housing on the exemplary side wall of the exemplary base, in one exemplary embodiment. A portion or more of the wall may extend below or above the lip and may cooperate with the side wall of the base in an exemplary embodiment to restrict and/or decrease and/or eliminate, the leakage of e.g., hot gases, such as, e.g., but not limited to, air, steam, etc., from the exemplary cooking enclosure. As may be seen in FIG. 3A of the '217 patent, according to an exemplary embodiment, exemplary embodiments of the portable countertop oven may include, at least a portion which may include an exemplary annular lead-in chamfer or exemplary relief that may serve to guide the portion into the exemplary base, and may thereby ease the engagement of at least a portion of the oven housing to the exemplary base and may prevent, or lessen mislocation of the exemplary at a portion of the housing relative to the exemplary base. The exemplary relief may allow, in an exemplary embodiment, for at least a portion of the portion to be, e.g., inserted into the exemplary base without precise vertical movement of the exemplary housing relative to the exemplary base, i.e., the exemplary housing can in an exemplary embodiment, be inserted into the exemplary base while being tilted somewhat relative to vertical, in one exemplary, but nonlimiting embodiment. In an exemplary embodiment, the exemplary oven housing may be formed at least in part, from a suitable material, such as, e.g., but not limited to, a transparent, translucent, or opaque polycarbonate, or other material.

As best seen in FIGS. 3 and 5 of the '217 patent, according to an exemplary embodiment, exemplary embodiments of the portable countertop oven may include, a power head, which in an exemplary embodiment, may include an at least partially, exterior housing assembly. The exemplary assembly may include an exemplary, but nonlimiting domed or otherwise shaped upper housing and may include one or more, or a pair of handle(s), and may include, in an exemplary embodiment, an at least partially lower housing which may include an exemplary cylindrical wall portion and may include an exemplary annular flange, or portion. As shown in FIG. 2 of the '217 patent, according to an exemplary embodiment, exemplary embodiments of the portable countertop oven may include, an exemplary one, two, three, four, or more optionally equally spaced lands, or other members (only one may be shown) and may be, e.g., but not limited to, raised from the exemplary cylindrical wall to engage an exemplary plurality of ramped tabs which may be formed in an exemplary embodiment, on the exemplary ring of an exemplary housing which may optionally detachably be attached, connected and/or coupled between the exemplary power head and at least a portion of the exemplary housing. Aspects of the exemplary power head of the '217 patent, according to an exemplary embodiment, may in exemplary embodiments of the portable countertop oven be included. An exemplary embodiment may include within the exemplary powerhead, in an exemplary embodiment, a motor for driving a cooling fan and/or an oven fan via an exemplary, but nonlimiting optional common shaft, an exemplary one or more infrared electric heating element(s), an exemplary heater/fan at least partially enclosing housing, an exemplary radiation plate or the like, which may be mounted or otherwise placed on an at least partially interior surface of the exemplary heater housing, an optionally glass and/or other material and/or optional fiber thermal insulator may be mounted between the exemplary heater housing and the exemplary motor. An optional, exemplary, but nonlimiting mica sheet may be mounted in an exemplary embodiment, between an exemplary at partially upper housing portion, and the at least partially lower housing, an exemplary protective grid, an exemplary one or more thermistor(s), an exemplary one or more thermostat(s), and/or an exemplary controller, which in an exemplary embodiment may be a microcontroller, and may include an exemplary pair of control board(s) for, e.g., controlling the exemplary heating element(s) and/or the motor and/or the one or more fan(s), and or any other controllable portion such as, e.g., a heating element, a display, an input device, a communications device, etc., in response to, e.g., but not limited to, input, output, instructions, and/or signals from, e.g., but not limited to, the thermistor(s) and/or command signal(s), input into a control panel, or other input device, and/or output to a display, and/or other output device, from and/or to an exemplary user, or network or element. The system may include any of various circuitry, and/or other components, to couple the subsystems to one another, and to the extent necessary to an exemplary power source, and/or supply or energy source or supply, etc. Preferably, the one or more fan(s) may be made of a suitable material such as, e.g., plastic, and/or metal, and/or polymer, or other material, while the exemplary fan or fans and/or the optional radiation plate may be made, formed, or constructed out of, e.g., but not limited to, aluminum, metallic, or other plate in order to reflect, at least in part the infrared energy from the one or more heater(s) down, up, or toward the at least partially interior portion of the at least a portion of the housing, and/or portion of the oven, and/or portion of the cooking enclosure. In an exemplary embodiment, the motor and/or or other drive member or propulsion device or apparatus may drive or cause to mobilize the one or more fan(s) at a suitable speed, such as, e.g., but not limited to, in the range of approximately 2500 rpm, which may provide an adequate or appropriately suitable air flow from the exemplary fan(s) to create a relatively even and/or uniform temperature throughout much of the cooking enclosure and to speed the cooking of exemplary food by exemplary convection to supplement the infrared cooking, without generating potentially, undesirable high speed air motion associated with some cyclonic electric counter-top ovens. In one embodiment, the level of motion of the fan or fans may be user selectable, or functionally selectable or variable. In an exemplary relatively low speed air flow created by the one or more fans it may help, at least in part, to maintain the hot surfaces of the exemplary oven in a temperature range that may tend to emit infrared radiation and may limit a decrease in emissivity of exemplary non-metal or other materials of the oven. In one exemplary embodiment the one or more heating element(s) be made of e.g., but not limited to, an exemplary incoloy 840 material, which may be coated with an exemplary G-1500 (CRC 1500) exemplary ceramic coating having an exemplary coating of exemplary thickness of 20±5 µm, with exemplary main components of the exemplary coating material being, e.g., but not limited to, $SiO_2$, $TiO_2$, and/or $Al_2O_3$, with an inorganic or other pigment, mainly, e.g., but not limited to, Si—O. The exemplary ceramic coating may increase the exemplary emissive power of the one or more heating elements and may shift the exemplary emission spectrum to the exemplary infrared range. With this exemplary coating, the heating element(s) may be capable of generating approximately 98% or more of its heat radiation in the infrared range. An exemplary sol-gel coating method may be used for coating the exemplary ceramic material firmly onto the incoloy 840 material, in an exemplary embodiment. Infrared electric heating element(s) of this exemplary construction may be used in other devices such as, e.g., hair dryers, bread makers, that may incorporate aspects of the present invention, etc. The exemplary grid may be made of 304 stainless steel or from any other suitable material such as, e.g., but not limited to, PTFE coated metallic, glass, and/or other material. In an exemplary embodiment, at least a portion of the upper or first portion of the housing may be made from an exemplary suitable material such as, e.g. but not limited to, polycarbonate material and at least a portion of the lower or second portion of the housing and the one or more heater housing or housings may be made from exemplary zinc plated steel, and/or steel coated with a suitable non-stick PTFE coating, or other suitable material, in an exemplary embodiment.

Together, the exemplary at least partially cylindrical wall portion of the first portion or lower housing, the one or more heater(s) housing(s), the one ore more radiation plate(s), the one or more fan(s), and/or the one or more heating element(s) may be included in an exemplary heating unit that may at least in part extend into at least a portion of the cooking enclosure and/or portion of the enclosure, and/or housing, through, e.g., but not limited to, an opening, or other coupling point or interface as may be formed at least in part by the exemplary cylindrical portion of the housing. Together, the at least partially upper housing and the optional exemplary mica sheet may define an exemplary one or more fan chamber(s) that may include a fan, or at least include air flow from one or more fans, and may thermally be insulated from an exemplary at least a portion interior of at least a portion of the exemplary cooking enclosure by the exemplary optional mica sheet, the exemplary glass fiber insulator, the one or more heater housing(s), the one or more radiation plate(s), and/or the at least partially lower housing. As seen in FIGS. 3 and 5 of the '217 patent, according to an exemplary embodiment, exemplary embodiments of the portable countertop oven may include, e.g., but not limited to, one or a plurality of cooling air outlet(s), which in an exemplary embodiment, may be formed in, and/or be cut from, or through one or more exemplary surfaces, such as, e.g., but not limited to, cylindrical and/or annular, and/or other shaped exemplary flange or other portion of the exemplary at least partially lower housing. Cut-outs, and or other openings, or the like may be provided in the exemplary optional mica sheet to prevent interference between e.g., but not limited to, the outlet(s) and the exemplary optional mica sheet and to allow an exemplary cooling air flow to pass through the optional exemplary mica sheet to the exemplary outlet(s). Preferably, the outlet(s) may be in an exemplary, but nonlimiting embodiment, be equally, and/or circumferentially and/or spaced around or at least partially around at least a portion of the exemplary flange.

Together the exemplary flange and/or the exemplary outlet(s) may define at least in part an exemplary, but nonlimiting cooling manifold, or portion thereof, that may surround the opening and/or or other interfacing or coupling portion of the housing and may face the exemplary surface at least partially outside of at least a portion of the exemplary cooking enclosure. The exemplary cooling fan actively cools at least a portion of the one or more fan chamber(s) and the exemplary walls of at least a portion of the housing by drawing a cooling air flow through one or a plurality of inlet openings formed in at least a portion of the at least partially upper housing and forcing the cooling air to exit through one or more outlet(s), which may direct at least a portion of the cooling air flow in a direction toward the surface of the housing to cool at least a portion of the housing, as indicated by arrows in figures of the '217 patent, according to an exemplary embodiment.

As may be seen in FIG. 6 of the '217 patent, according to an exemplary embodiment, exemplary embodiments of the portable countertop oven may include, in an exemplary embodiment the wall and/or the flange and may be spaced in an exemplary embodiment, from the at least partially cylindrical ring of the at least partial housing by the exemplary tabs to define at least partially one or more hot gas vent(s) that may at least partially surround at least a portion of the one or more heating unit(s) between the one or more heating units and the one or more outlets to vent hot gas, such as steam, from the inside of the cooking enclosure for mixture with the cooling air flow from the air outlets, as shown by the arrows.

The exemplary control boards may be spaced from the at least partially interior surface of the upper housing by a plurality of exemplary mount supports to allow the cooling air flow to pass over both sides of the control boards as it circulates around the one or more fan chambers before exiting through the one or more outlets, thereby enhancing the cooling of the electronics on the one or more control boards, according to an exemplary embodiment.

As seen in FIG. 7 of the '217 patent, according to an exemplary embodiment, exemplary embodiments of the portable countertop oven may include, one or more controller(s) which may be attached, connected, and/or coupled to the one or more motor(s) and/or the one or more heating element(s) to control the flow of electric power to the one or more motor(s) and/or the one or more heating element(s) in response to exemplary signals from the one or more thermistors and/or command signals input by the control panel or other exemplary input, output, and/or input/output device as instructed, or selected by a user. The exemplary controller may be configured to selectively power the heating element at a number of power levels P from a minimum power to a maximum power. In one exemplary embodiment, the controller may be programmable and/or may allow programming of multiple stages, and/or one or more functions such as, e.g., but not limited to, programming one or more stages of a recipe, a user selectable programmable stage, such as, e.g., but not limited to a user selectable time period, or user selectable temperature, and/or heating element setting, a delay stage, a sear stage, a high heat stage, a roast stage, a delay to allow an the oven to reach a desired temperature, such as a searing temperature, safety features, such as a maximum allowable time period at a given heating level, etc. According to an exemplary embodiment, at each power increment P, the controller may power the one or more heating element(s) when the one or more thermistor(s) indicate that the temperature in the oven has fallen below a low temperature set point associated with the particular power level P. According to an exemplary embodiment, the controller may terminate power to the heating element when the temperature indicated by the thermistor exceeds an exemplary high temperature set point associated with the particular power level P. According to an exemplary embodiment, the controller may provide power continuously to the motor during the heating operations regardless of the power level selected.

As seen in FIG. 8 of the '217 patent, according to an exemplary embodiment, exemplary embodiments of the portable countertop oven may include, the controller which may be configured in an exemplary embodiment to limit the cooking time at the maximum power setting to two hours to prevent overheating of the oven. More specifically, after a user sets the power level P and enters the desired cook time t, it may be determined whether the power has been set to an exemplary maximum power level. If the power is set to maximum, it may be determined whether the desired cooking time exceeds an exemplary threshold or maximum time period or temperature, such as, e.g., but not limited to, two hours. If the desired cooking time exceeds the exemplary limit of two hours, the cooking time may automatically be limited to two hours by the controller, according to one exemplary embodiment. If the desired cooking time is less than two hours, or if the power level P is not set to maximum, the controller may be configured to run the heating element and the motor at the power level and for the desired cooking time t, as shown at block.

According to an exemplary embodiment, after the cooking time has expired, the controller may be configured to terminate power to the heating element and to the motor. However, as an optional feature, after the cooking time has expired, in an exemplary embodiment, the controller may be configured to terminate power to the one or more heating elements while providing power to the one or more motors for an exemplary, but nonlimiting five minute cooling stage. This may allow time for the hot gases in the oven to be vented and to be cooled by the cooling air flow from the outlet(s), thereby preventing hot gases, such as steam, from accumulating in the cooking enclosure and/or the fan chamber and also preventing the handles from overheating.

As may be seen in FIG. 9A of the '217 patent, according to an exemplary embodiment, exemplary embodiments of the portable countertop oven may include, a protective grid, which may include a first pair of legs that may be oppositely directed relative to a second pair of legs. As may be seen in FIG. 9B of the '217 patent, according to an exemplary embodiment, exemplary embodiments of the portable countertop oven may include, each of the legs may be slidably received in a mating aperture in the heater housing to detachably mount the protective grid to the heater housing in an exemplary embodiment. A fastener may be engaged with the heater housing for movement between a first position shown in FIG. 9A of the '217 patent, according to an exemplary embodiment, exemplary embodiments of the portable countertop oven may include, where the fastener engages one of the legs to restrict movement of the grid relative to the heater housing to prevent removal of the grid from the heater housing, and a second position shown in FIG. 9B of the '217 patent, according to an exemplary embodiment, exemplary embodiments of the portable countertop oven may include, where the fastener may be disengaged from the one leg 152 to, e.g., allow removal of the grid from the heater housing. As seen in FIG. 9B of the '217 patent, according to an exemplary embodiment, exemplary embodiments of the portable countertop oven may include, the fastener being provided in the form of a threaded set screw that may be threadably engaged with the housing, with the end of the set screw frictionally engaging the one leg in the first position shown in FIG. 9A of the '217 patent, according to an exemplary embodiment. In this regard, it should be noted that for the fastener to be in the second position it need not be completely removed from the housing as shown in FIG. 9B of the '217 patent, according to an exemplary embodiment, rather, the fastener need only be positioned so that it is disengaged from the one leg to allow movement of the grid relative to the housing. As shown in FIG. 9C of the '217 patent, according to an exemplary embodiment, exemplary embodiments of the portable countertop oven may include, where the fastener in the second position, the legs can be slid in the apertures to allow the grid to move relative to the housing in the direction of the legs, as indicated by Arrow A, to thereby remove the legs from their mating apertures. Once the legs are removed from their mating apertures, the grid can be tilted downward as shown by the arrow B in FIG. 9D of the '217 patent, according to an exemplary embodiment, and then the grid can be moved in the direction of the legs, as indicated by Arrow C, to thereby remove the legs from their mating apertures and thus, the grid from the housing. Removal of the grid may allow for cleaning of the exemplary one or more heating element(s), the one or more fan(s), the one or more reflector plates, and/or the at least a portion of the interior of the housing.

As may be seen in FIGS. 10 and 11 of the '217 patent, according to an exemplary embodiment, exemplary embodiments of the portable countertop oven may include, in an optional embodiment of the base, the one or more supports may be provided in the form of three or more circumferentially spaced feet that may extend from the exemplary side wall to underlie the oven pan, and/or the thermal insulators may be provided in the form of one, two, three or more thermal insulating spacers, each of which may be supported by one of the feet.

As may be seen in FIGS. 12 and 13 of the '217 patent, according to an exemplary embodiment, exemplary embodiments of the portable countertop oven may include, in one optional embodiment of the base 12, the one or more supports may be provided in the form of an annular shoulder formed on the interior surface of the base, and the one or more insulators may be provided in the form of a thermal insulating ring that may be supported by the shoulder.

Conclusion

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A portable countertop electric oven for cooking food, the oven comprising:
   at least one cooking housing;
   at least one power head operative to be coupled to the at least one cooking housing, at least a portion of the at least one power head extending into at least a portion of an interior of the cooking housing,
   wherein said at least one power head comprises a porting element coupled to an upper portion of said at least one power head for enabling lifting or mobility of the device;
   at least one base operative to be coupled to the at least one cooking housing; and
   at least one first securing element operable to secure the at least one cooking housing to the at least one base.

2. The portable countertop electric oven of claim 1, further comprising an oven pan disposed to be placed in a central cavity of the base.

3. The portable countertop electric oven of claim 2, further comprising a grill disposed to be placed in the oven pan.

4. The portable countertop electric oven of claim 1, wherein said porting element comprises an inverted substantially u-shaped handle.

5. The portable countertop electric oven of claim 4, wherein the porting element comprises the handle, wherein the handle is formed from a portion of the power head.

6. The portable countertop electric oven of claim 5, wherein the portion of the power head comprises first and second bulged regions of the power head.

7. The portable countertop electric oven of claim 1, wherein the power head is detachably coupled to the cooking housing by a second securing element.

8. The portable countertop electric oven of claim 7, wherein the second securing element comprises one or more raised lands operative to engage with one or more ramped tabs.

9. The portable countertop electric oven of claim 8, wherein the raised lands are formed from a material comprising the power head, and wherein the ramped tabs are formed in a material comprising the cooking housing.

10. The portable countertop electric oven of claim 1, wherein the cooking housing forms an open area between the base and the power head.

11. The portable countertop electric oven of claim 1, wherein at least one of: the cooking housing; or the power head and the base, at least partially comprises a polycarbonate material.

12. The portable countertop electric oven of claim 1, wherein at least one of: the cooking housing; the power head and the base, have a substantially elliptical shape.

13. The portable countertop electric oven of claim 12, wherein at least one of: the cooking housing; the power head; or the base, comprises two bulged portions at respective distal ends thereof.

14. The portable countertop electric oven of claim 13, wherein the base comprises two bulged portions, and a gap is formed in the sidewall thereof in the vicinity of said bulged portions of the base.

15. The portable countertop electric oven of claim 1, wherein the first securing element comprises an attachment clip comprising a first region operable to engage with the cooking housing and a second region operable to engage with the base.

16. The portable countertop electric oven of claim 15, wherein the first region comprises at least one of: one or more engagement teeth disposed to engage with corresponding one or more grooves of the cooking housing; or one or more grooves formed by the material of the first region disposed to engage with one or more rim portions of the cooking housing.

17. The portable countertop electric oven of claim 15, wherein the second region comprises at least one pin portion disposed to engage with one or more corresponding recessed groove portions of the base.

18. A method of manufacturing a portable countertop electric oven for cooking food, the method comprising:
   producing at least one cooking housing;
   producing at least one power head operative to be coupled to the at least one cooking housing, at least a portion of the at least one power head extending into at least a portion of an interior of the at least one cooking housing;
   producing at least one base operative to be coupled to the at least one cooking housing; and
   producing at least one first securing element operable to secure the at least one cooking housing to the at least one base.

19. The method of claim 18, wherein at least one of: the cooking housing; or the power head and the base, are produced to have a substantially elliptical shape.

20. The method of claim 19, wherein at least one of: the cooking housing; the power head; or the base, are produced to comprise two bulged portions at respective distal ends thereof.

* * * * *